(12) United States Patent
Ott et al.

(10) Patent No.: US 9,535,229 B2
(45) Date of Patent: Jan. 3, 2017

(54) FIBER OPTIC CASSETTE, SYSTEM, AND METHOD

(71) Applicants: Michael James Ott, Hudson, WI (US); David Patrick Murray, Bristol (GB); Patrick J. Thompson, Prior Lake, MN (US)

(72) Inventors: Michael James Ott, Hudson, WI (US); David Patrick Murray, Bristol (GB); Patrick J. Thompson, Prior Lake, MN (US)

(73) Assignee: CommScope Technologies LLC, Hickory, NC (US)

( * ) Notice: Subject to any disclaimer, the term of this patent is extended or adjusted under 35 U.S.C. 154(b) by 196 days.

(21) Appl. No.: 13/645,634

(22) Filed: Oct. 5, 2012

(65) Prior Publication Data
US 2013/0089292 A1 Apr. 11, 2013

Related U.S. Application Data

(60) Provisional application No. 61/544,987, filed on Oct. 7, 2011.

(51) Int. Cl.
*G02B 6/36* (2006.01)
*G02B 6/44* (2006.01)
*G02B 6/38* (2006.01)

(52) U.S. Cl.
CPC .......... *G02B 6/4471* (2013.01); *G02B 6/4453* (2013.01); *G02B 6/3897* (2013.01)

(58) Field of Classification Search
CPC ... G02B 6/3616; G02B 6/4439; G02B 6/4453; G02B 6/4454; G02B 6/4455; G02B 6/4471

(Continued)

(56) References Cited

U.S. PATENT DOCUMENTS 4,359,262 A 11/1982 Dolan
4,502,754 A 3/1985 Kawa
(Continued)

FOREIGN PATENT DOCUMENTS

AU 40995/85 4/1985
AU 55314/86 3/1986
(Continued)

OTHER PUBLICATIONS

International Search Report and Written Opinion for PCT/US2012/058955 mailed May 15, 2013.
(Continued)

*Primary Examiner* — Rhonda Peace
(74) *Attorney, Agent, or Firm* — Merchant & Gould P.C.

(57) ABSTRACT

A fiber optic cassette including a body defining a front and an opposite rear and an enclosed interior. A cable entry location is defined in the body for a cable to enter the interior of the cassette. The cable which enters at the cable entry location is attached to the cassette body and the fibers are extended into the cassette body and form terminations at connectors. The connectors are connected to adapters located at the front of the cassette. A front side of the adapters defines termination locations for cables to be connected to the fibers connected at the rear of the adapters. A cable including a jacket, a strength member, and fibers enters the cassette. The strength member is crimped to a crimp tube and is mounted to the cassette body, allowing the fibers to extend past the crimp tube into the interior of the cassette body. A strain relief boot is provided at the cable entry location.

19 Claims, 34 Drawing Sheets

(58) Field of Classification Search
USPC .......................................................... 385/135
See application file for complete search history.

(56) References Cited

U.S. PATENT DOCUMENTS

| | | | |
|---|---|---|---|
| 4,585,303 A | 4/1986 | Pinsard et al. | |
| 4,595,255 A | 6/1986 | Bhatt et al. | |
| 4,630,886 A | 12/1986 | Lauriello et al. | |
| 4,697,874 A | 10/1987 | Nozick | |
| 4,699,455 A | 10/1987 | Erbe et al. | |
| 4,708,430 A | 11/1987 | Donaldson et al. | |
| 4,717,231 A | 1/1988 | Dewez et al. | |
| 4,733,936 A | 3/1988 | Mikolaicyk et al. | |
| 4,736,100 A | 4/1988 | Vastagh | |
| 4,747,020 A | 5/1988 | Brickley et al. | |
| 4,765,710 A | 8/1988 | Burmeister et al. | |
| 4,792,203 A | 12/1988 | Nelson et al. | |
| 4,824,196 A | 4/1989 | Bylander | |
| 4,861,134 A | 8/1989 | Alameel et al. | |
| 4,900,123 A | 2/1990 | Barlow et al. | |
| 4,948,220 A | 8/1990 | Violo et al. | |
| 4,971,421 A | 11/1990 | Ori | |
| 4,986,762 A | 1/1991 | Keith | |
| 4,995,688 A | 2/1991 | Anton et al. | |
| 5,011,257 A | 4/1991 | Wettengel et al. | |
| 5,023,646 A | 6/1991 | Ishida et al. | |
| 5,058,983 A * | 10/1991 | Corke | G02B 6/243 385/78 |
| 5,067,784 A | 11/1991 | Debortoli et al. | |
| 5,071,211 A | 12/1991 | Debortoli et al. | |
| 5,073,042 A * | 12/1991 | Mulholland | G02B 6/3825 385/56 |
| 5,076,688 A | 12/1991 | Bowen et al. | |
| 5,100,221 A | 3/1992 | Carney et al. | |
| 5,109,447 A | 4/1992 | Chan | |
| 5,127,082 A | 6/1992 | Below et al. | |
| 5,129,030 A | 7/1992 | Petrunia | |
| 5,138,688 A | 8/1992 | Debortoli | |
| 5,142,598 A | 8/1992 | Tabone | |
| 5,142,606 A | 8/1992 | Carney et al. | |
| 5,155,785 A | 10/1992 | Holland et al. | |
| 5,160,188 A | 11/1992 | Rorke et al. | |
| 5,167,001 A | 11/1992 | Debortoli et al. | |
| 5,179,618 A | 1/1993 | Anton | |
| 5,202,942 A * | 4/1993 | Collins | G02B 6/4478 385/81 |
| 5,208,885 A | 5/1993 | Dragone et al. | |
| 5,212,761 A * | 5/1993 | Petrunia | 385/135 |
| 5,214,735 A | 5/1993 | Henneberger et al. | |
| 5,233,674 A | 8/1993 | Vladic | |
| 5,235,665 A * | 8/1993 | Marchesi et al. | 385/135 |
| 5,259,051 A | 11/1993 | Burack et al. | |
| 5,274,729 A | 12/1993 | King et al. | |
| 5,274,731 A | 12/1993 | White | |
| 5,287,425 A * | 2/1994 | Chang | 385/81 |
| 5,289,558 A | 2/1994 | Teichler et al. | |
| 5,317,663 A | 5/1994 | Beard et al. | |
| 5,318,259 A | 6/1994 | Fussler | |
| 5,333,221 A | 7/1994 | Briggs et al. | |
| 5,333,222 A | 7/1994 | Belenkiy et al. | |
| 5,335,349 A | 8/1994 | Kutsch et al. | |
| 5,353,367 A | 10/1994 | Czosnowski et al. | |
| 5,359,688 A | 10/1994 | Underwood | |
| 5,363,440 A | 11/1994 | Daoud | |
| 5,363,465 A | 11/1994 | Korkowski et al. | |
| 5,363,467 A | 11/1994 | Keith | |
| 5,367,598 A | 11/1994 | Devenish, III et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,420,958 A | 5/1995 | Henson et al. | |
| 5,430,823 A | 7/1995 | Dupont et al. | |
| 5,432,875 A | 7/1995 | Korkowski et al. | |
| 5,438,641 A | 8/1995 | Malacarne | |
| 5,442,726 A | 8/1995 | Howard et al. | |
| 5,448,015 A | 9/1995 | Jamet et al. | |
| 5,461,690 A | 10/1995 | Lampert | |
| 5,469,526 A | 11/1995 | Rawlings | |
| 5,490,229 A | 2/1996 | Ghandeharizadeh et al. | |
| 5,497,444 A | 3/1996 | Wheeler | |
| 5,509,096 A | 4/1996 | Easley | |
| 5,511,144 A | 4/1996 | Hawkins et al. | |
| 5,530,783 A | 6/1996 | Belopolsky et al. | |
| 5,542,015 A | 7/1996 | Hultermans | |
| 5,570,450 A | 10/1996 | Fernandez et al. | |
| 5,613,030 A | 3/1997 | Hoffer et al. | |
| 5,636,138 A | 6/1997 | Gilbert et al. | |
| 5,647,043 A | 7/1997 | Anderson et al. | |
| 5,655,044 A | 8/1997 | Finzel et al. | |
| 5,689,604 A | 11/1997 | Janus et al. | |
| 5,708,751 A | 1/1998 | Mattei | |
| 5,715,348 A | 2/1998 | Falkenberg et al. | |
| 5,717,810 A | 2/1998 | Wheeler | |
| 5,734,776 A | 3/1998 | Puetz | |
| 5,742,480 A | 4/1998 | Sawada et al. | |
| 5,758,002 A | 5/1998 | Walters | |
| 5,758,003 A | 5/1998 | Wheeler et al. | |
| 5,764,844 A | 6/1998 | Mendes | |
| 5,774,245 A | 6/1998 | Baker | |
| 5,774,612 A | 6/1998 | Belenkiy et al. | |
| 5,781,686 A | 7/1998 | Robinson et al. | |
| 5,784,515 A | 7/1998 | Tamaru et al. | |
| 5,823,646 A | 10/1998 | Arizpe et al. | |
| 5,825,955 A | 10/1998 | Ernst et al. | |
| 5,841,917 A | 11/1998 | Jungerman et al. | |
| 5,870,519 A * | 2/1999 | Jenkins et al. | 385/135 |
| 5,883,995 A | 3/1999 | Lu | |
| 5,887,095 A | 3/1999 | Nagase et al. | |
| 5,889,910 A | 3/1999 | Igl et al. | |
| 5,903,698 A | 5/1999 | Poremba et al. | |
| 5,909,526 A | 6/1999 | Roth et al. | |
| 5,930,425 A | 7/1999 | Abel et al. | |
| 5,945,633 A | 8/1999 | Ott et al. | |
| 5,956,444 A | 9/1999 | Duda et al. | |
| 5,966,492 A | 10/1999 | Bechamps et al. | |
| 5,969,294 A | 10/1999 | Eberle et al. | |
| 5,971,626 A | 10/1999 | Knodell et al. | |
| 5,975,769 A * | 11/1999 | Larson | G02B 6/4453 385/134 |
| 5,987,203 A | 11/1999 | Abel et al. | |
| 6,005,991 A | 12/1999 | Knasel | |
| 6,012,852 A | 1/2000 | Kadar-Kallen et al. | |
| 6,022,150 A | 2/2000 | Erdman et al. | |
| 6,027,252 A | 2/2000 | Erdman et al. | |
| 6,041,155 A | 3/2000 | Anderson et al. | |
| 6,044,193 A | 3/2000 | Szentesi et al. | |
| 6,061,492 A | 5/2000 | Strause et al. | |
| 6,076,975 A | 6/2000 | Roth | |
| 6,079,881 A | 6/2000 | Roth | |
| 6,097,872 A | 8/2000 | Kusuda et al. | |
| 6,149,315 A | 11/2000 | Stephenson | |
| 6,160,946 A | 12/2000 | Thompson et al. | |
| 6,167,183 A * | 12/2000 | Swain | 385/135 |
| 6,179,475 B1 | 1/2001 | Takamatsu et al. | |
| 6,181,845 B1 | 1/2001 | Horsthuis et al. | |
| 6,188,687 B1 | 2/2001 | Mussman et al. | |
| 6,188,825 B1 | 2/2001 | Bandy et al. | |
| 6,208,779 B1 | 3/2001 | Rowlette, Sr. et al. | |
| 6,208,796 B1 | 3/2001 | Vigliaturo | |
| 6,215,938 B1 | 4/2001 | Reitmeier et al. | |
| 6,222,976 B1 | 4/2001 | Shahid | |
| 6,227,717 B1 | 5/2001 | Ott et al. | |
| 6,234,683 B1 | 5/2001 | Waldron et al. | |
| 6,236,795 B1 | 5/2001 | Rodgers | |
| 6,240,229 B1 | 5/2001 | Roth | |
| 6,256,443 B1 | 7/2001 | Uruno | |
| 6,269,214 B1 | 7/2001 | Naudin et al. | |
| 6,271,484 B1 | 8/2001 | Tokutsu | |
| 6,278,829 B1 | 8/2001 | BuAbbud et al. | |
| 6,304,690 B1 | 10/2001 | Day | |
| RE37,489 E | 1/2002 | Anton et al. | |
| 6,347,888 B1 | 2/2002 | Puetz | |
| 6,351,590 B1 | 2/2002 | Shahid | |

(56) References Cited

U.S. PATENT DOCUMENTS

| | | |
|---|---|---|
| 6,352,374 B1 | 3/2002 | Selfridge et al. |
| 6,356,697 B1 | 3/2002 | Braga et al. |
| 6,360,050 B1 | 3/2002 | Moua et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,661 B2 | 11/2002 | Kadar-Kallen et al. |
| 6,483,977 B2 | 11/2002 | Battey et al. |
| 6,493,480 B1 | 12/2002 | Lelic |
| 6,496,638 B1 | 12/2002 | Andersen |
| 6,496,640 B1 | 12/2002 | Harvey et al. |
| 6,504,988 B1 | 1/2003 | Trebesch et al. |
| 6,510,273 B2 | 1/2003 | Ali et al. |
| 6,526,210 B1 | 2/2003 | Harrison et al. |
| 6,532,332 B2 | 3/2003 | Solheid et al. |
| 6,535,682 B1 | 3/2003 | Puetz et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 | 4/2003 | Puetz et al. |
| 6,573,451 B2 | 6/2003 | Komiya et al. |
| 6,577,595 B1 | 6/2003 | Counterman |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,600,866 B2 | 7/2003 | Gatica et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| RE38,311 E | 11/2003 | Wheeler |
| 6,648,376 B2 | 11/2003 | Christianson |
| 6,654,536 B2 | 11/2003 | Battey et al. |
| 6,661,961 B1 | 12/2003 | Allen et al. |
| 6,668,127 B1 | 12/2003 | Mahony |
| 6,688,780 B2 | 2/2004 | Duran |
| 6,690,862 B1 | 2/2004 | Rietveld |
| 6,709,607 B2 | 3/2004 | Hibbs-Brenner et al. |
| 6,711,339 B2 | 3/2004 | Puetz et al. |
| 6,736,670 B2 | 5/2004 | Clark et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,761,585 B2 | 7/2004 | Clark et al. |
| 6,763,166 B2 | 7/2004 | Yow, Jr. et al. |
| 6,764,221 B1 | 7/2004 | de Jong et al. |
| 6,768,860 B2 | 7/2004 | Liberty |
| 6,775,458 B2 | 8/2004 | Yow, Jr. et al. |
| 6,778,752 B2 | 8/2004 | Laporte et al. |
| 6,788,786 B1 | 9/2004 | Kessler et al. |
| 6,788,846 B2 * | 9/2004 | Hileman et al. ............... 385/27 |
| 6,792,190 B2 | 9/2004 | Xin et al. |
| 6,792,191 B1 | 9/2004 | Clapp, Jr. et al. |
| 6,793,517 B2 | 9/2004 | Neer et al. |
| 6,796,717 B2 | 9/2004 | Petrillo |
| 6,801,680 B2 | 10/2004 | Lin |
| 6,810,193 B1 | 10/2004 | Müller |
| 6,815,612 B2 | 11/2004 | Bloodworth et al. |
| 6,819,821 B2 | 11/2004 | Lacey et al. |
| 6,845,207 B2 | 1/2005 | Schray |
| 6,845,208 B2 | 1/2005 | Thibault et al. |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,888,069 B1 | 5/2005 | Chen et al. |
| 6,901,200 B2 | 5/2005 | Schray |
| 6,909,833 B2 | 6/2005 | Henschel et al. |
| 6,912,349 B2 | 6/2005 | Clark et al. |
| 6,916,199 B2 | 7/2005 | Follingstad |
| 6,920,213 B2 | 7/2005 | Pershan |
| 6,920,274 B2 | 7/2005 | Rapp et al. |
| 6,925,241 B2 | 8/2005 | Bohle et al. |
| 6,934,457 B2 | 8/2005 | Vincent et al. |
| 6,937,800 B2 | 8/2005 | Cote |
| 6,950,593 B2 | 9/2005 | Hodge et al. |
| 6,959,139 B2 | 10/2005 | Erwin et al. |
| 6,968,111 B2 | 11/2005 | Trebesch et al. |
| 6,980,725 B1 | 12/2005 | Swieconek |
| 6,983,095 B2 | 1/2006 | Reagan et al. |
| H2144 H | 2/2006 | Baechtle et al. |
| 7,006,748 B2 | 2/2006 | Dagley et al. |
| 7,020,359 B2 | 3/2006 | Mayer |
| 7,029,322 B2 | 4/2006 | Ernst et al. |
| 7,058,245 B2 | 6/2006 | Farahi |
| 7,066,762 B2 | 6/2006 | Neer et al. |
| 7,066,771 B2 | 6/2006 | Clark et al. |
| 7,068,907 B2 | 6/2006 | Schray |
| 7,074,744 B2 | 7/2006 | Selvamanickam et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,092,592 B2 | 8/2006 | Verhagen et al. |
| 7,094,095 B1 | 8/2006 | Caveney |
| 7,102,884 B2 | 9/2006 | Mertesdorf et al. |
| 7,103,255 B2 | 9/2006 | Reagan et al. |
| 7,130,498 B2 | 10/2006 | Meis et al. |
| 7,139,456 B2 | 11/2006 | Sasaki et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,179,119 B2 | 2/2007 | Follingstad |
| 7,186,032 B1 | 3/2007 | Stevens et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,241,182 B2 | 7/2007 | Clark et al. |
| 7,244,144 B2 | 7/2007 | Follingstad |
| 7,277,620 B2 | 10/2007 | Vongseng et al. |
| 7,302,153 B2 | 11/2007 | Thom |
| 7,330,546 B2 | 2/2008 | Kessler et al. |
| 7,333,707 B2 | 2/2008 | Puetz et al. |
| 7,335,056 B1 | 2/2008 | Clark et al. |
| 7,346,254 B2 | 3/2008 | Kramer et al. |
| 7,357,667 B2 | 4/2008 | Clark et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,377,697 B2 | 5/2008 | Kahle et al. |
| 7,391,952 B1 * | 6/2008 | Ugolini ............... G02B 6/4453 385/134 |
| 7,400,813 B2 | 7/2008 | Zimmel |
| 7,400,816 B2 | 7/2008 | Reagan et al. |
| 7,406,240 B2 | 7/2008 | Murano |
| 7,407,330 B2 | 8/2008 | Smith et al. |
| 7,408,769 B2 | 8/2008 | Mertesdorf et al. |
| 7,412,147 B2 | 8/2008 | Scadden |
| 7,416,349 B2 | 8/2008 | Kramer |
| 7,418,181 B2 | 8/2008 | Zimmel et al. |
| 7,433,915 B2 | 10/2008 | Edwards et al. |
| 7,455,548 B2 | 11/2008 | Clark et al. |
| 7,457,503 B2 | 11/2008 | Solheid et al. |
| 7,460,757 B2 | 12/2008 | Hoehne et al. |
| 7,471,869 B2 | 12/2008 | Reagan et al. |
| 7,493,002 B2 | 2/2009 | Coburn et al. |

(56) References Cited

U.S. PATENT DOCUMENTS

| | | | |
|---|---|---|---|
| 7,496,268 B2 | 2/2009 | Escoto et al. | |
| 7,515,805 B2 | 4/2009 | Vongseng et al. | |
| 7,519,259 B2 | 4/2009 | Vongseng et al. | |
| 7,534,135 B2 | 5/2009 | Follingstad | |
| 7,544,090 B2 | 6/2009 | Follingstad | |
| 7,553,091 B2 | 6/2009 | McColloch | |
| 7,555,193 B2 | 6/2009 | Rapp et al. | |
| 7,623,749 B2 | 11/2009 | Reagan et al. | |
| 7,627,204 B1 | 12/2009 | Deane | |
| 7,646,958 B1 | 1/2010 | Reagan et al. | |
| 7,686,658 B2 | 3/2010 | Clark et al. | |
| 7,689,089 B2 | 3/2010 | Wagner et al. | |
| 7,706,656 B2 | 4/2010 | Zimmel | |
| 7,722,261 B2 | 5/2010 | Kadar-Kallen et al. | |
| 7,738,755 B2 | 6/2010 | Shioda | |
| 7,738,760 B2 | 6/2010 | Fredrickson et al. | |
| 7,747,125 B1* | 6/2010 | Lee et al. | 385/135 |
| RE41,460 E | 7/2010 | Wheeler | |
| 7,751,674 B2 | 7/2010 | Hill | |
| 7,775,725 B2 | 8/2010 | Grinderslev | |
| 7,805,043 B2 | 9/2010 | Puetz et al. | |
| 7,809,232 B2 | 10/2010 | Reagan et al. | |
| 7,809,233 B2 | 10/2010 | Smith et al. | |
| 7,809,234 B2 | 10/2010 | Smith et al. | |
| 7,809,235 B2 | 10/2010 | Reagan et al. | |
| 7,822,313 B2 | 10/2010 | Rapp et al. | |
| 7,826,706 B2 | 11/2010 | Vongseng et al. | |
| 7,841,775 B2 | 11/2010 | Smith et al. | |
| 7,844,159 B2 | 11/2010 | Solheid et al. | |
| 7,844,161 B2 | 11/2010 | Reagan et al. | |
| 7,856,166 B2 | 12/2010 | Biribuze et al. | |
| 7,873,255 B2 | 1/2011 | Reagan et al. | |
| 7,889,961 B2* | 2/2011 | Cote et al. | 385/135 |
| 7,934,948 B2 | 5/2011 | Follingstad | |
| 7,942,004 B2 | 5/2011 | Hodder | |
| 7,945,138 B2 | 5/2011 | Hill et al. | |
| 7,961,999 B2* | 6/2011 | Frohlich et al. | 385/135 |
| 7,983,521 B2 | 7/2011 | Rapp et al. | |
| 8,019,192 B2 | 9/2011 | Puetz et al. | |
| 8,059,932 B2 | 11/2011 | Hill et al. | |
| 8,078,017 B2 | 12/2011 | Kodama et al. | |
| 8,085,472 B2 | 12/2011 | Kadar-Kallen | |
| 8,139,913 B2 | 3/2012 | Bolster et al. | |
| 8,195,022 B2 | 6/2012 | Coburn et al. | |
| 8,358,900 B2 | 1/2013 | Rapp et al. | |
| 8,374,477 B2* | 2/2013 | Hill | 385/135 |
| 8,406,587 B2 | 3/2013 | Mudd et al. | |
| 8,417,074 B2 | 4/2013 | Nhep et al. | |
| 8,428,418 B2* | 4/2013 | Smrha | 385/135 |
| 8,600,208 B2 | 12/2013 | Badar et al. | |
| 8,649,648 B2 | 2/2014 | Coburn et al. | |
| 8,660,397 B2* | 2/2014 | Giraud | G02B 6/4441 385/135 |
| 8,690,593 B2 | 4/2014 | Anderson et al. | |
| 8,712,206 B2* | 4/2014 | Cooke et al. | 385/135 |
| 9,223,094 B2* | 12/2015 | Schneider | G02B 6/3608 |
| 2001/0041025 A1 | 11/2001 | Farahi | |
| 2002/0034290 A1 | 3/2002 | Pershan | |
| 2002/0097962 A1 | 7/2002 | Yoshimura et al. | |
| 2002/0131719 A1 | 9/2002 | Grois et al. | |
| 2002/0150372 A1 | 10/2002 | Schray | |
| 2002/0181893 A1* | 12/2002 | White | G02B 6/3887 385/86 |
| 2002/0181922 A1 | 12/2002 | Xin et al. | |
| 2003/0002812 A1 | 1/2003 | Lampert | |
| 2003/0007767 A1 | 1/2003 | Douglas et al. | |
| 2003/0042040 A1 | 3/2003 | Komiya et al. | |
| 2003/0044141 A1 | 3/2003 | Melton et al. | |
| 2003/0072537 A1 | 4/2003 | Eichenberger et al. | |
| 2003/0095772 A1 | 5/2003 | Solheid et al. | |
| 2003/0128951 A1 | 7/2003 | Lecomte et al. | |
| 2003/0147597 A1 | 8/2003 | Duran | |
| 2003/0165315 A1 | 9/2003 | Trebesch et al. | |
| 2003/0174953 A1 | 9/2003 | Carnevale et al. | |
| 2003/0174996 A1 | 9/2003 | Henschel et al. | |

| | | | |
|---|---|---|---|
| 2003/0182015 A1 | 9/2003 | Domaille et al. | |
| 2003/0223724 A1 | 12/2003 | Puetz et al. | |
| 2004/0028368 A1* | 2/2004 | Hileman et al. | 385/135 |
| 2004/0074852 A1 | 4/2004 | Knudsen et al. | |
| 2004/0109660 A1 | 6/2004 | Liberty | |
| 2004/0126069 A1 | 7/2004 | Jong et al. | |
| 2004/0136638 A1 | 7/2004 | Baechtle et al. | |
| 2004/0165852 A1 | 8/2004 | Erwin et al. | |
| 2004/0172492 A1 | 9/2004 | Farnworth et al. | |
| 2004/0175090 A1* | 9/2004 | Vastmans et al. | 385/135 |
| 2004/0228598 A1 | 11/2004 | Allen et al. | |
| 2004/0264873 A1 | 12/2004 | Smith et al. | |
| 2005/0002633 A1 | 1/2005 | Solheid et al. | |
| 2005/0003697 A1 | 1/2005 | Neer et al. | |
| 2005/0018950 A1 | 1/2005 | Arellano | |
| 2005/0048831 A1 | 3/2005 | Neer et al. | |
| 2005/0053337 A1 | 3/2005 | Mayer | |
| 2005/0084200 A1 | 4/2005 | Meis et al. | |
| 2005/0123261 A1 | 6/2005 | Bellekens et al. | |
| 2005/0129379 A1 | 6/2005 | Reagan et al. | |
| 2006/0029353 A1 | 2/2006 | Bolster et al. | |
| 2006/0093274 A1 | 5/2006 | Kahle et al. | |
| 2006/0093301 A1 | 5/2006 | Zimmel et al. | |
| 2006/0177175 A1 | 8/2006 | Mayer et al. | |
| 2006/0210222 A1 | 9/2006 | Watte et al. | |
| 2006/0210229 A1 | 9/2006 | Scadden | |
| 2006/0228086 A1 | 10/2006 | Holmberg et al. | |
| 2006/0269205 A1 | 11/2006 | Zimmel | |
| 2006/0269206 A1 | 11/2006 | Zimmel | |
| 2007/0003204 A1 | 1/2007 | Makrides-Saravanos et al. | |
| 2007/0025675 A1 | 2/2007 | Kramer | |
| 2007/0047893 A1 | 3/2007 | Kramer et al. | |
| 2007/0189692 A1 | 8/2007 | Zimmel et al. | |
| 2007/0230863 A1 | 10/2007 | Fukuda et al. | |
| 2008/0008436 A1 | 1/2008 | Reagan et al. | |
| 2008/0008437 A1 | 1/2008 | Reagan et al. | |
| 2008/0019655 A1 | 1/2008 | Vongseng et al. | |
| 2008/0025684 A1 | 1/2008 | Vongseng et al. | |
| 2008/0089656 A1* | 4/2008 | Wagner et al. | 385/135 |
| 2008/0131067 A1 | 6/2008 | Ugolini et al. | |
| 2008/0175550 A1 | 7/2008 | Coburn et al. | |
| 2008/0273846 A1 | 11/2008 | Register | |
| 2008/0317425 A1 | 12/2008 | Smith et al. | |
| 2009/0041417 A1 | 2/2009 | Rapp et al. | |
| 2009/0067800 A1 | 3/2009 | Vazquez et al. | |
| 2009/0067802 A1 | 3/2009 | Hoehne et al. | |
| 2009/0074372 A1 | 3/2009 | Solheid et al. | |
| 2009/0087157 A1 | 4/2009 | Smith et al. | |
| 2009/0097800 A1 | 4/2009 | Gurreri et al. | |
| 2009/0097813 A1 | 4/2009 | Hill | |
| 2009/0190896 A1 | 7/2009 | Smith et al. | |
| 2009/0196565 A1 | 8/2009 | Vongseng et al. | |
| 2009/0245743 A1 | 10/2009 | Cote et al. | |
| 2009/0257726 A1 | 10/2009 | Redmann et al. | |
| 2009/0269018 A1* | 10/2009 | Frohlich et al. | 385/135 |
| 2009/0274431 A1 | 11/2009 | Krampotich et al. | |
| 2009/0285540 A1 | 11/2009 | Reagan et al. | |
| 2009/0290843 A1 | 11/2009 | Reagan et al. | |
| 2009/0297111 A1 | 12/2009 | Reagan et al. | |
| 2009/0324189 A1* | 12/2009 | Hill et al. | 385/135 |
| 2010/0129028 A1 | 5/2010 | Nhep et al. | |
| 2010/0142910 A1* | 6/2010 | Hill et al. | 385/135 |
| 2010/0158465 A1 | 6/2010 | Smrha | |
| 2010/0316335 A1 | 12/2010 | Furuyama | |
| 2010/0322562 A1 | 12/2010 | Barnes et al. | |
| 2010/0322576 A1 | 12/2010 | Rhoney et al. | |
| 2010/0322577 A1 | 12/2010 | Bolster et al. | |
| 2010/0322579 A1* | 12/2010 | Cooke et al. | 385/135 |
| 2011/0019964 A1* | 1/2011 | Nhep et al. | 385/135 |
| 2011/0044599 A1 | 2/2011 | Kowalczyk et al. | |
| 2011/0065909 A1 | 3/2011 | Lange et al. | |
| 2011/0085771 A1 | 4/2011 | Matsuyama et al. | |
| 2011/0096404 A1 | 4/2011 | Kadar-Kallen | |
| 2011/0110673 A1 | 5/2011 | Elberbaum | |
| 2011/0182558 A1* | 7/2011 | Garcia et al. | 385/135 |
| 2011/0217016 A1 | 9/2011 | Mullsteff | |
| 2011/0222829 A1 | 9/2011 | Loeffelholz et al. | |
| 2011/0262077 A1 | 10/2011 | Anderson et al. | |
| 2011/0268404 A1 | 11/2011 | Cote et al. | |

(56) References Cited

U.S. PATENT DOCUMENTS

| | | | |
|---|---|---|---|
| 2011/0268408 A1 | 11/2011 | Giraud et al. | |
| 2011/0268410 A1 | 11/2011 | Giraud et al. | |
| 2011/0268412 A1 | 11/2011 | Giraud et al. | |
| 2011/0268414 A1* | 11/2011 | Giraud et al. | 385/135 |
| 2011/0274400 A1 | 11/2011 | Mudd et al. | |
| 2011/0317973 A1 | 12/2011 | Rapp et al. | |
| 2012/0008900 A1 | 1/2012 | Schneider | |
| 2012/0014645 A1 | 1/2012 | Kadar-Kallen | |
| 2012/0020618 A1 | 1/2012 | Erdman et al. | |
| 2012/0020619 A1 | 1/2012 | Kadar-Kallen et al. | |
| 2012/0051706 A1 | 3/2012 | Van Geffen et al. | |
| 2012/0051708 A1 | 3/2012 | Badar et al. | |
| 2012/0057838 A1 | 3/2012 | Hill et al. | |
| 2012/0263415 A1 | 10/2012 | Tan et al. | |
| 2012/0301098 A1* | 11/2012 | Benedetto et al. | 385/135 |
| 2013/0004506 A1 | 1/2013 | Eberle et al. | |
| 2013/0064495 A1 | 3/2013 | Eberle, Jr. | |
| 2013/0064506 A1* | 3/2013 | Eberle et al. | 385/49 |
| 2013/0077913 A1 | 3/2013 | Schneider et al. | |
| 2013/0089292 A1* | 4/2013 | Ott et al. | 385/78 |
| 2013/0148936 A1 | 6/2013 | Hill | |
| 2015/0253514 A1* | 9/2015 | Murray | G02B 6/3608 385/14 |

FOREIGN PATENT DOCUMENTS

| | | |
|---|---|---|
| CA | 2789159 | 8/2011 |
| CN | 1250527 A | 4/2000 |
| CN | 2426610 Y | 4/2001 |
| CN | 201540384 U | 8/2010 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EA | 002870 | 10/2002 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 697 610 A1 | 2/1996 |
| EP | 0 743 701 A2 | 11/1996 |
| EP | 0 788 002 A1 | 8/1997 |
| EP | 0 871 047 A1 | 10/1998 |
| EP | 0 563 995 B1 | 10/1999 |
| EP | 0 975 180 A1 | 1/2000 |
| EP | 1 045 267 A1 | 10/2000 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| JP | 63-229409 | 9/1988 |
| JP | 1144266 S | 6/2002 |
| JP | 3307618 B2 | 7/2002 |
| JP | 3761762 B2 | 3/2006 |
| WO | WO 91/10927 | 7/1991 |
| WO | WO 94/17534 | 8/1994 |
| WO | WO 95/20175 | 7/1995 |
| WO | WO 98/53347 | 11/1998 |
| WO | WO 99/27404 | 6/1999 |
| WO | WO 00/05611 | 2/2000 |
| WO | WO 00/07053 | 2/2000 |
| WO | WO 00/52504 | 9/2000 |
| WO | WO 00/75706 | 12/2000 |
| WO | WO 01/75495 | 10/2001 |
| WO | WO 02/21182 | 3/2002 |
| WO | WO 02/103429 | 12/2002 |
| WO | WO 03/021312 | 3/2003 |
| WO | WO 03/093883 A2 | 11/2003 |
| WO | WO 2008/027201 A2 | 3/2008 |
| WO | WO 2008/089192 | 7/2008 |
| WO | WO 2009/120280 | 10/2009 |

OTHER PUBLICATIONS

"ADC OMX 600 Optical Distribution Frame Solution," ADC Telecommunications, Inc., Publication No. 856, 8 pgs. (Feb. 2000).

"OMX™ 600 Optical Distribution Frame," ADC Telecommunications, Inc., Publication No. 854, front cover, table of contents, pp. 1-13, rear cover (Apr. 2000).

21 photographs showing what Afl Telecommunications LLC purports to be the ECOE cabinet referenced in the Prior art statement and the Supplemental prior art statement listed above. AFL Telecommunications LLC asserts the cabinet was on sale as early as 2001.

24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).

ADC Telecommunications brochure entitled "Fiber Cable Management Products, Second Edition," 144 pages, dated Oct. 1995.

ADC Telecommunications, Inc. brochure entitled "FL2000 Products," Publication No. 803, 51 pages (Nov. 1996).

ADC Telecommunications brochure entitled "Next Generation Frame (NGF) Product Family Ordering Guide," 22 pages, dated Oct. 1998.

ADC Telecommunications, Inc., brochure entitled "Value-Added Module (VAM) System: Monitor, Splitter, WDM and CWDM Modules and Chassis for Switching Office, Central Exchange and Headend Applications, 1st edition," Part No. 101663BE, 36 pages (Feb. 2008).

ADC Telecommunications, Inc., "Value-Added Module (VAM) System—Monitor, Splitter, WDM/CWDM/DWDM Modules and Chassis—5$^{th}$ Edition," Oct. 2009, 32 Pages.

ADC Telecommunications, Inc., 600 mm Products, Value-Added Module System, pp. 53-78 (Oct. 2003).

ADC Telecommunications, Inc., brochure entitled "Value-Added Module System," Publication No. 891, 29 pages (Apr. 2000).

ADC Telecommunications, Inc., brochure entitled "Value-Added Module System: Optical Distribution Frame (OMX™ 600)," Publication No. 891-OMX, 11 pages (Jan. 2002).

ADC Telecommunications, Inc., brochure entitled "Fiber Management Tray: 2 Rack Unit (2 RU) Style FMT-G Series," Publication No. 1258896, 8 pages (Mar. 2003).

ADC Telecommunications, Inc., FMT Micro Value Added Monitor Module Configuration Scheme, pp. 1-2 (Feb. 6, 2003).

ADC Telecommunications, Inc., Mini VAM Connector Cleaning Instructions, ADCP-90-412, Issue 3, pp. 1-8 (Sep. 2002).

ADC Telecommunications, Inc., Mini VAM Splitter Mod (Installation Drawing), Drawing No. 1128185, 2 pages (Mar. 14, 2001).

ADC Telecommunications, Inc., Next Generation Frame (NGF) Product Tour, Value Added Modules (VAMs), Copyright 2003, 1 page, (admitted as offered for sale as of Apr. 25, 2006).

ADC Telecommunications, Inc., brochure entitled "Fiber Panel Products, Second Edition," front cover, Table of Contents, and pp. 1-111, Publication No. 846 (Jul. 1996) (116 pages total).

ADC Telecommunications, Inc.'s 6th Edition of Next Generation Frame (NGF) Product Family Ordering Guide; front cover, Table of Contents, pp. 1-41, and back cover; Item No. 820 (revised Feb. 2003) (44 pages total).

ADC Telecommunications, Inc.'s Fiber Optic, Cable Assemblies and Accessories Brochure; front cover, Table of Contents, pp. 1-23, and back cover; Item No. 100300 (revised Apr. 2003).

ADC Telecommunications, Inc., Next Generation Frame (NGF) Product Family, Publication No. 832, 8 pages, (Dec. 2000).

ADC Telecommunications, Inc., brochure entitled "Secure Fiber Entrance Terminal (SFET), " front cover, pp. 2-7, and back cover, Item No. 1005 (revised May 1998) (8 pages total).

ADC Telecommunications, Inc., brochure entitled "Outside Plant,

(56) References Cited

OTHER PUBLICATIONS

Fiber Cross-Connect Solutions," front cover, Table of Contents, pp. 1-48, and back cover, Item No. 1047 (Jun. 2002).
AMP Inc. catalog entitled "Fiber Optic Products," front and back covers and p. 59, (4 pgs.) (© 1991).
Assembly reference drawings having drawing No. 1067101, dated Aug. 17, 1999 (8 pages).
AT&T Network Systems catalog entitled "Fiber Optic Products Innovation for wide ranging applications," front and back covers and pp. 6-1 through 6-16 (18 pages total) (© 1995).
AT&T Network Systems, Product Bulletin, "High Density Interconnect System (HDIC)," 2987D-DLH-7/89, Issue 2, 4 pages (Copyright 1989).
ATI Optique Catalog, ATI Optique Division of TI electronique, Version 2.6, released Mar. 27, 2002 (50 pages).
Bockstaele et al., "A scalable parallel optical interconnect family," IO Overview Paper—Apr. 2004.
Amphenol Corp., brochure entitled "Amphenol® 954 Series one piece SC Connector," F122-00311, Issue 1, 2 pages (Aug. 1990).
Connectorized splitter drawings having drawing No. 1067961, dated Aug. 18, 1999 (2 pages).
Alcoa Fujikura Ltd., brochure entitled "Couplers: Couplers WDMS Packaging,", 5 pages (copyright 2000).
Fiber distribution drawings having drawing No. 1069967, dated Aug. 17, 1999 (2 pages).
FONS Corporation, MDC Series Rack or Wall Mount Enclosures product sheet, 3 pages (2002).
FONS Corporation, Modular Distribution Cabinets Rack Mount Enclosures, Model MDC-7, product sheet, 2 pages (2005).
FONS Corporation's Technical Drawing No. 11669, Rev. D, of Distribution Cabinet Assembly MFDC-7, 1 page (technical drawing depicting the device shown in Exhibit M). 2004.
Grimes, Gary J., "Applications of Parallel Optical Interconnects," Lasers and Electro-Optics Society Annual Meeting, Nov. 18-21, 1996, vol. 2, pp. 6-7.
Hasegawa et al., "100GHz-48CH Athermal AWG with a Novel Temperature Insensitive Principle," National Fiber Optics Engineers Conference, 2003 Technical Proceedings, pp. 801-808.

Hirose Electric Co., Ltd., catalog entitled "Optical Fibre Connectors," Catalog No. O.F. (9) 3K, front and back covers and pp. 16, 17 and 49 (Mar. 1991) (5 pages total).
Installation drawings having drawing No. 1069965, dated Aug. 14, 1999 (3 pages).
Corning Cable Systems, "Installation Instructions for 12-position Splice Protector Insert," SRP-001-276, Issue 4, 1 page (Jul. 2001).
International Standard, "Fiber optic connector interfaces—Part 4-1: Type SC connector family—Simplified receptacle SC-PC connecter interfaces," Copyright IEC 61754-4-1, First edition, Jan. 2003 (9 pages).
Iwano, S. et al., "MU-type Optical Fiber Connector System," *NTT Review*, vol. 9, No. 2, pp. 63-71 (Mar. 1997).
Corning Cable Systems, "Jumper Routing Procedure for Enhanced Management Frame," SRP-003-599, Issue 2, 4 pages (Apr. 2002).
Nexans, "Cross-Connect Cabinet III: Plastic Watertight Cabinet for FTTH Applications," 2 pages (Oct. 2002).
Nexans, "Cross-Connect Cabinet V: Metallic Watertight Cabinet for FTTH Applications," 2 pages (Oct. 2002).
Northern Telecom Bulletin #91-004, Issue #2, 16 pages (May 1991).
"Optical fiber coupler review," Manufacturing Group at the Optoelectronics Division, Technical Report 2001, Products Presentation, showing Sumitomo Osaka Cement Co. Ltd's Optical Coupler (pp. 41-42).
Precision Mechanical, in Chinese with English Translation, 5 pages (publicly known at least as early as Aug. 2002).
Preface to the book "Structure, Installation, Connection and Protection of Communication Optical Fiber Cable," in Chinese with English Translation, 14 pages (Mar. 1992).
Schneider et al., "Fibre Optic Circuits," TechCon 2011 (10 pages).
Shahid, et al., "Flexible High Density Optical Circuits," National Fiber Optic Engineers Conference, 2001 Technical Proceedings.
Sugita et al., "SC-Type Single-Mode Optical Fiber Connectors," *Journal of Lightwave Technology*, vol. 7, No. 11, pp. 1689-1696 (Nov. 1989).
Tachikura et al., Newly Developed Optical Fiber Distribution System and Cable Management in Central Office, International Wire & Cable Symposium, Proceedings of the 50th IWCS, pp. 98-105.
European Search Report for Application No. 12839995.3 mailed Jul. 16, 2015.

* cited by examiner

FIBER OPTIC CASSETTE, SYSTEM, AND METHOD

CROSS REFERENCE TO RELATED APPLICATION

This application claims the benefit of U.S. Provisional Patent Application Ser. No. 61/544,987, filed Oct. 7, 2011, which application is hereby incorporated by reference in its entirety.

BACKGROUND OF THE INVENTION

As demand for telecommunications increases, fiber optic networks are being extended in more and more areas. Management of the cables, ease of installation, and case of accessibility for later management are important concerns. As a result, there is a need for fiber optic devices and methods which address these and other concerns.

SUMMARY

An aspect of the present disclosure relates to a fiber optic cassette including a body defining a front and an opposite rear and an enclosed interior. A cable entry location is defined in the body for a cable to enter the interior of the cassette. The cable which enters at the cable entry location is attached to the cassette body and the fibers are extended into the cassette body and form terminations at connectors. The connectors are connected to adapters located at the front of the cassette. A front side of the adapters defines termination locations for cables to be connected to the fibers connected at the rear of the adapters.

One aspect of the invention relates to providing a cable including a jacket, a strength member. The strength member and the jacket are crimped to a crimp tube and is mounted to the cassette body, allowing the fibers to extend past the crimped tube into the interior of the cassette body. A strain relief boot is provided at the cable entry location.

In one embodiment, the cable entry location is located at the rear of the cassette body opposite to the front. In one embodiment, the cassette body defines a top surface and a bottom surface which define major sides of the cassette body and extend between the front and the rear. The adapters along the front are arranged linearly in one embodiment and extend in a longitudinal direction parallel to the major surfaces defined by the top and the bottom of the cassette body. The cassette can be oriented in any position, so that the top and bottom sides can be reversed, or positioned vertically, or at some other orientation.

In one embodiment, the cable at the cable entry location extends parallel to the longitudinal direction before entry into the cassette body.

Disposed within the cassette body are cable radius limiters which provide cable management of the fibers extending from the cable entry location to the connectors at the rear of the adapters.

In one embodiment, an adapter block with a plurality of adapters is formed and includes a front end, a rear end, and internal structures which allow mating with fiber optic connectors at the front end, such as SC or LC style connectors. The adapter block may be removable from a remainder of the cassette.

In one embodiment, a rear of the adapter block defines a rear clip which retains a split sleeve and a hub and ferrule of a connector which terminates an interior fiber. In another embodiment, the rear end of the adapter block defines an opening for receipt of an SC or LC style connector.

The cassette can be utilized in a chassis which includes a stationary mount relative to the chassis, or the cassette can be movably mounted, such as in a variety of sliding movements to allow access to a selected cassette, thereby improving access to a selected front connector attached to the cassette.

DETAILED DESCRIPTION

Figure 1:
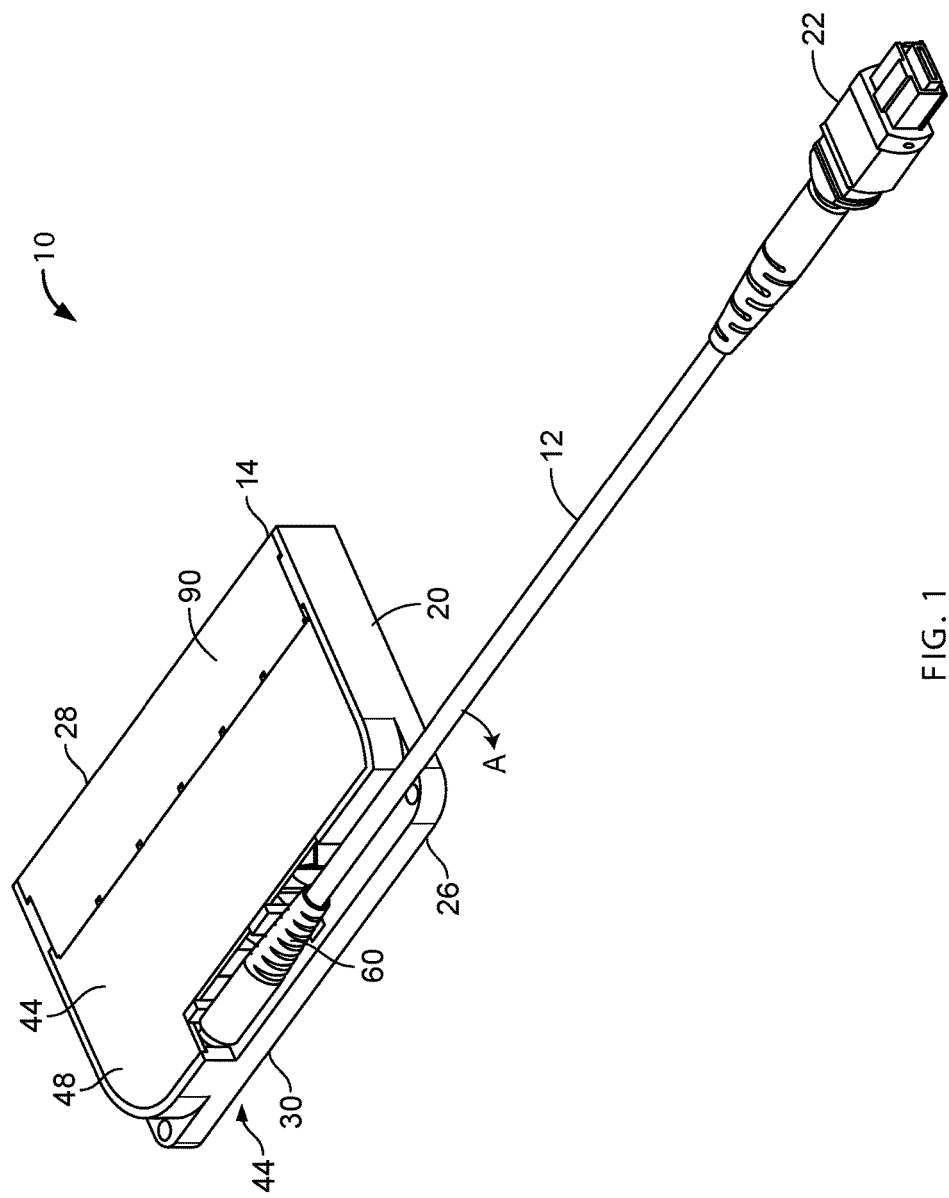
FIG. 1 is a perspective view of a first embodiment of a fiber optic cassette in accordance with the present invention.
Figure 2:
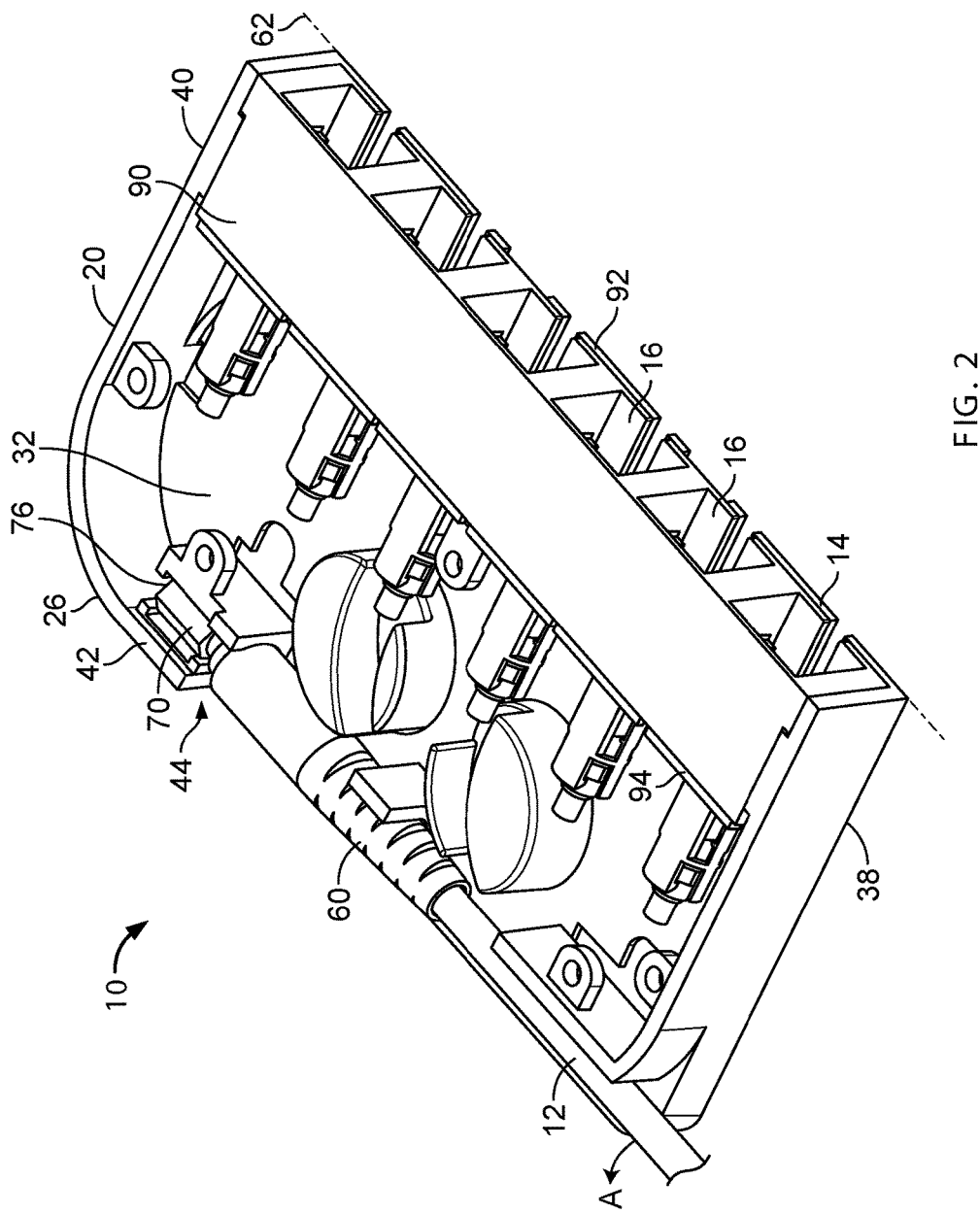
FIG. 2 is a further perspective view of FIG. 1 with a portion of the body removed to expose an interior of the cassette.
Figure 3:
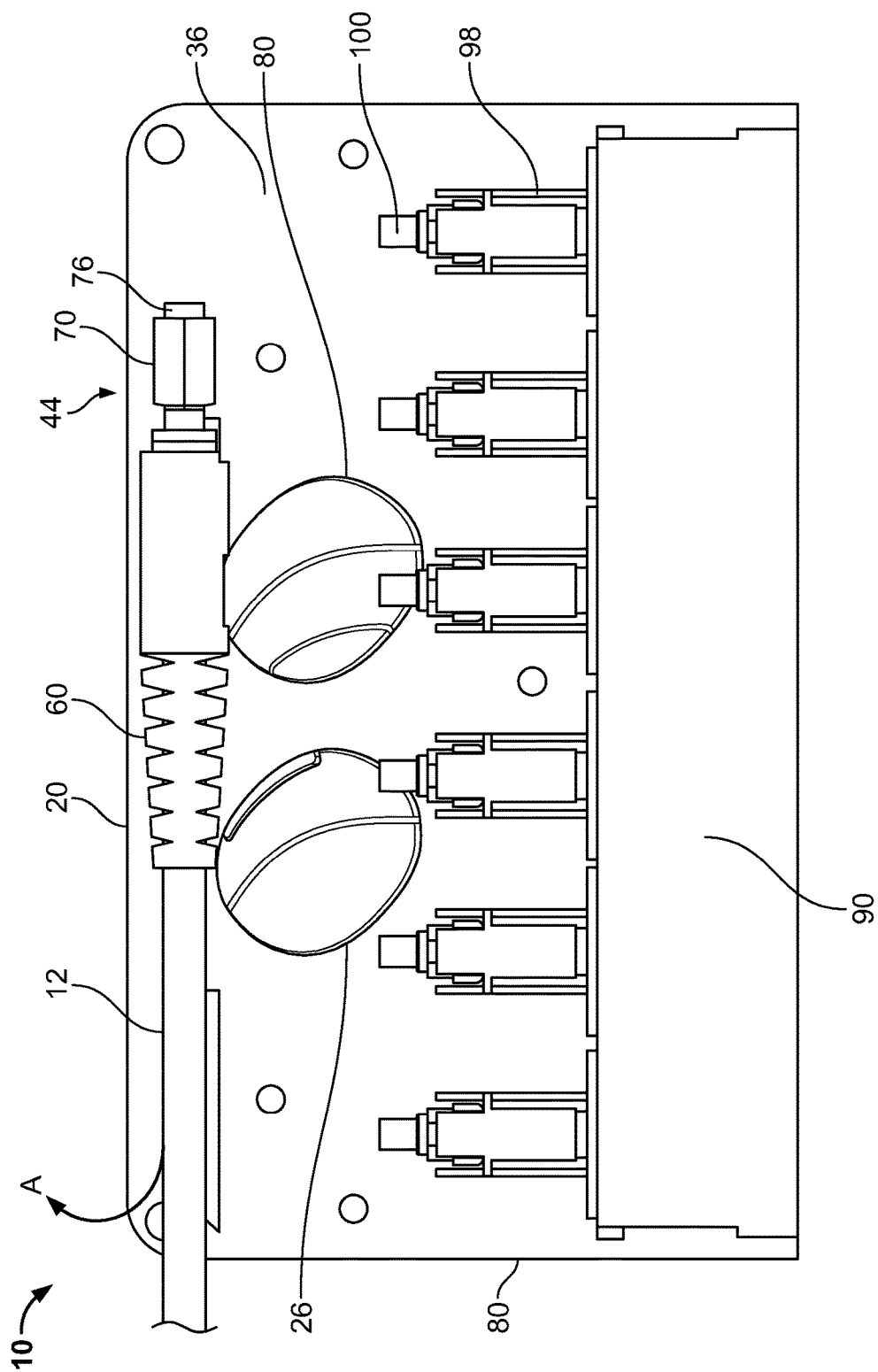
FIG. 3 is a top view of the cassette view of FIG. 2.
Figure 4:
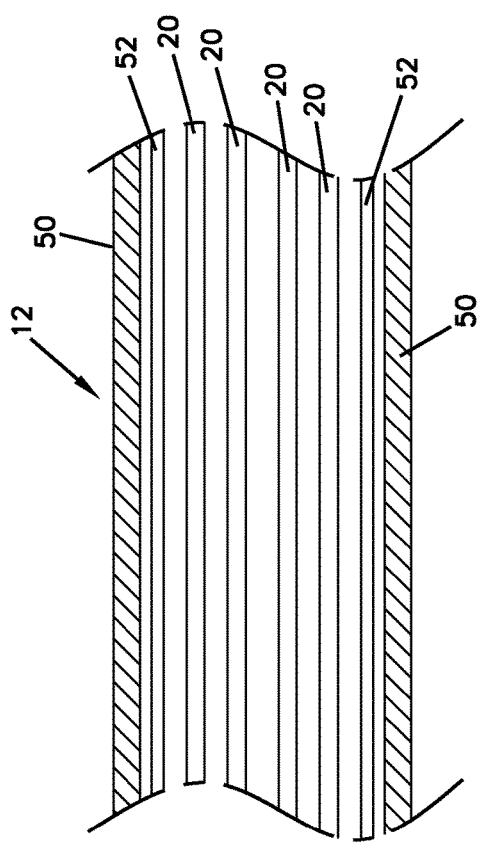
FIG. 4 is a schematic view of a portion of a fiber optic cable.
Figure 5:
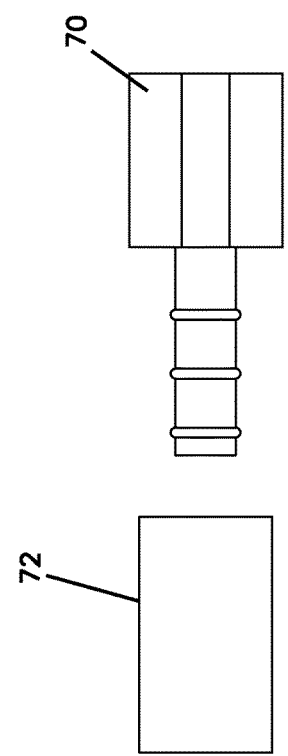
FIG. 5 is a schematic view of a crimp tube and crimp ring used for crimping to a cable of FIG. 4.
Figure 6:
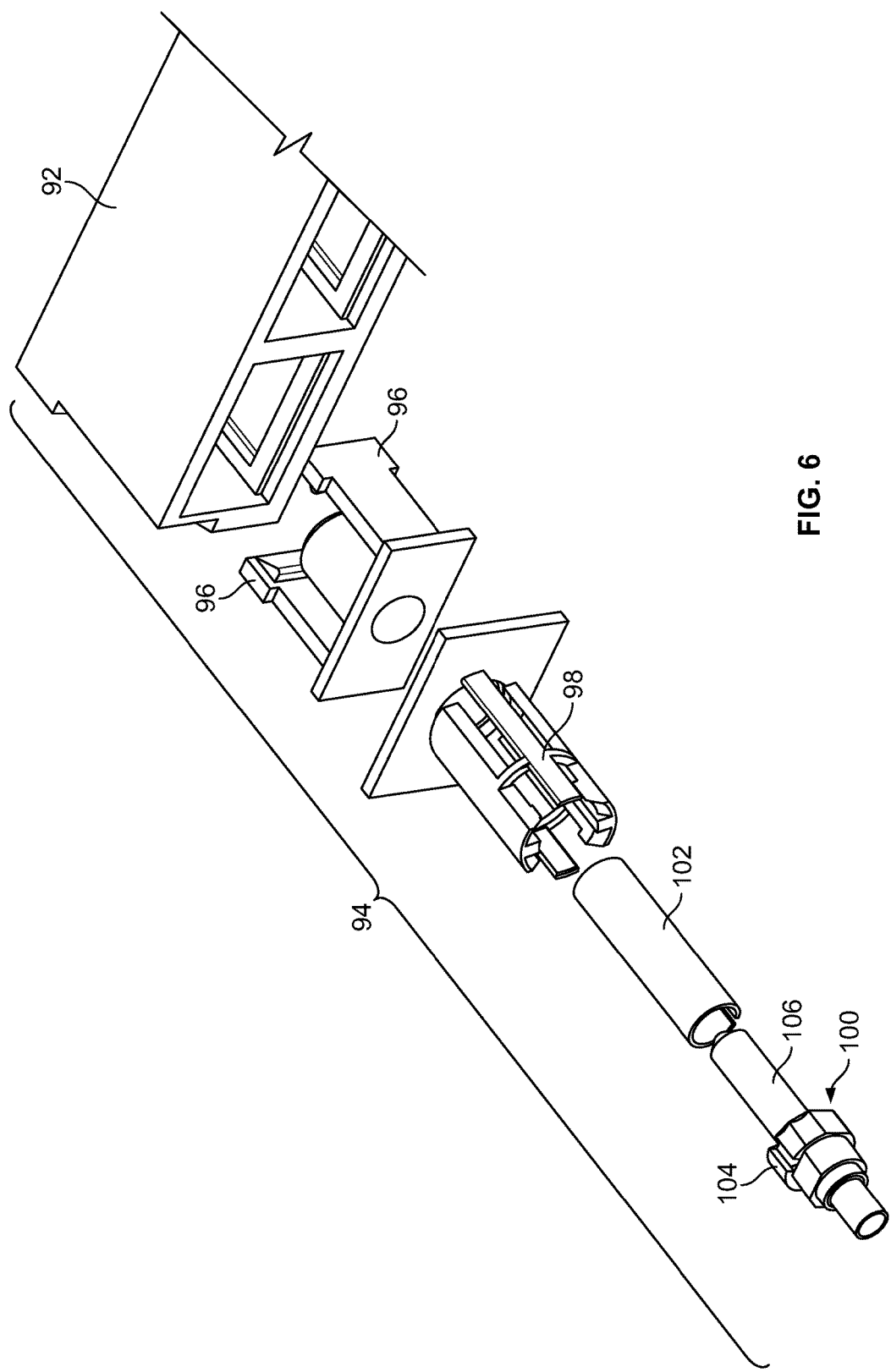
FIG. 6 is an exploded view showing a rear of the adapter block including a front portion for mating with an SC connector, and a rear portion which mates with a rear connector including a hub and ferrule.
Figure 7:
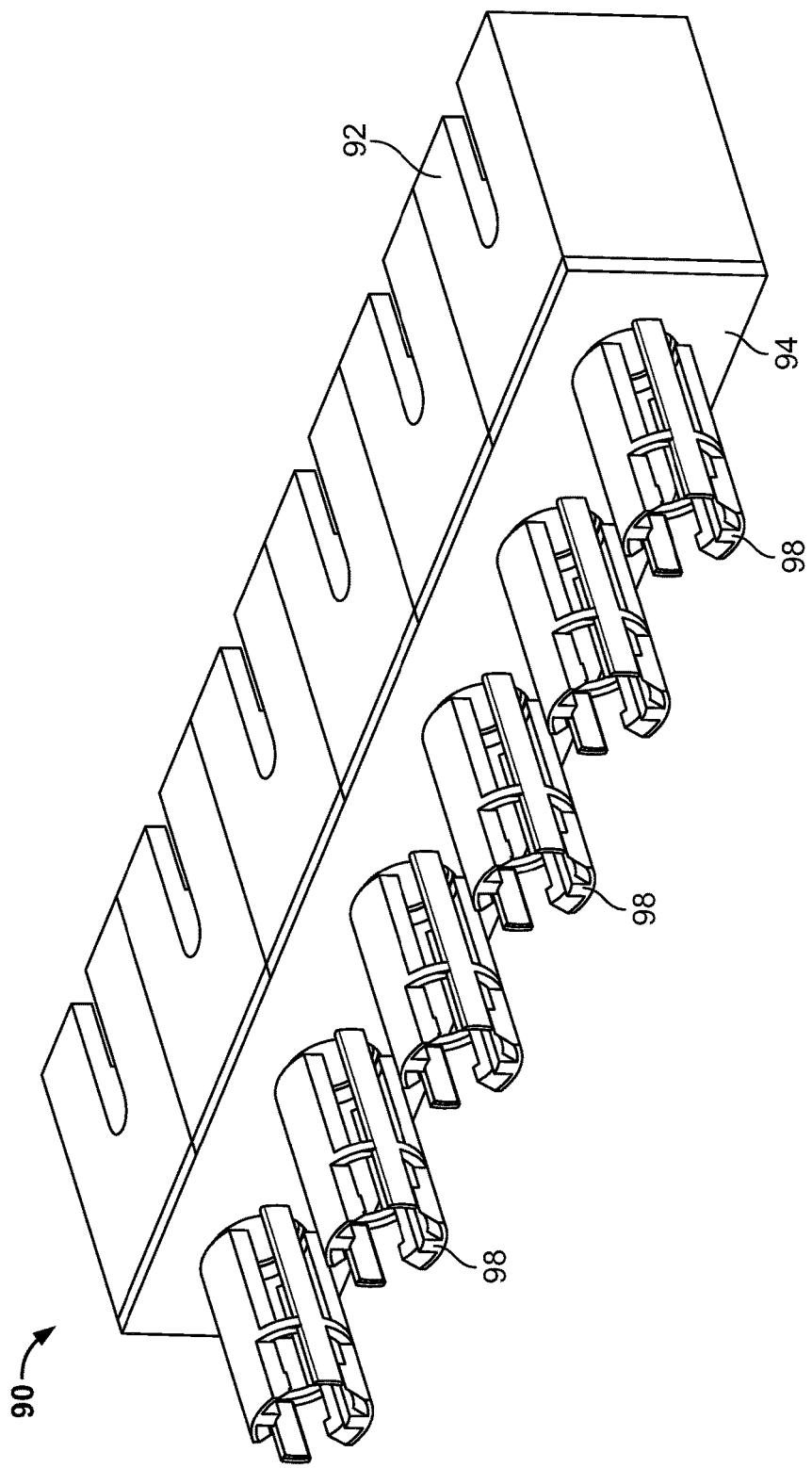
FIG. 7 shows a perspective view of the adapter block of the cassette of FIG. 1.

In FIGS. 1-8, a first fiber optic cassette 10 is shown including a first cable 12 connected to adapters or an adapter block 14 for receipt of connectors, such as LC or SC connectors at front ports 16. Cassette 10 has a single cable 12 which includes multiple fibers 20 which terminate at a distal connector 22, such as an MPO style connector. Cable 12 can be a variety of lengths such as one to 3 feet up to 50 to 100 feet, or more.

Cassette 10 includes a body 26 defining a front 28, a rear 30 and an interior 32. Body 26 further includes a top 34, a bottom 36, and sides 38, 40. Cassette body 26 defines a cable entry location 44 which in the illustrated embodiment is along rear 30. In the illustrated embodiment, cable 12 includes an outer jacket 50 and inner strength member 52 around inner fibers 20. Fibers 20 extend past an end of jacket 50, and an end of strength member 52, and into interior 32 for connection with the front connectors at adapters 14.

As shown, cable 12 includes a boot 60 to provide strain relief at cable entry location 44. Cable 12 can flex away from cassette body 26 in the direction of arrow A, and is protected from excessive bending by boot 60. Entry 44 is located close to corner 42, so that boot 60 and cable 12 is partially protected at entry 44 by being able to reside in a rear channel 46.

Adapters 14 are arranged linearly and positioned along longitudinal axis 62. Cable 12 at cable entry location 44 extends parallel to the longitudinal axis 62, although some bending is permitted relative to the longitudinal axis 62.

In general, cassette 10 includes top 34 and bottom 36 which are generally parallel to each other and define the major surfaces of cassette body 26. Sides 38, 40, front 28, and rear 30 define the minor sides of cassette body 26. The cassette can be oriented in any position, so that the top and bottom surfaces can be reversed, or positioned vertically, or at some other orientation.

Figure 20:
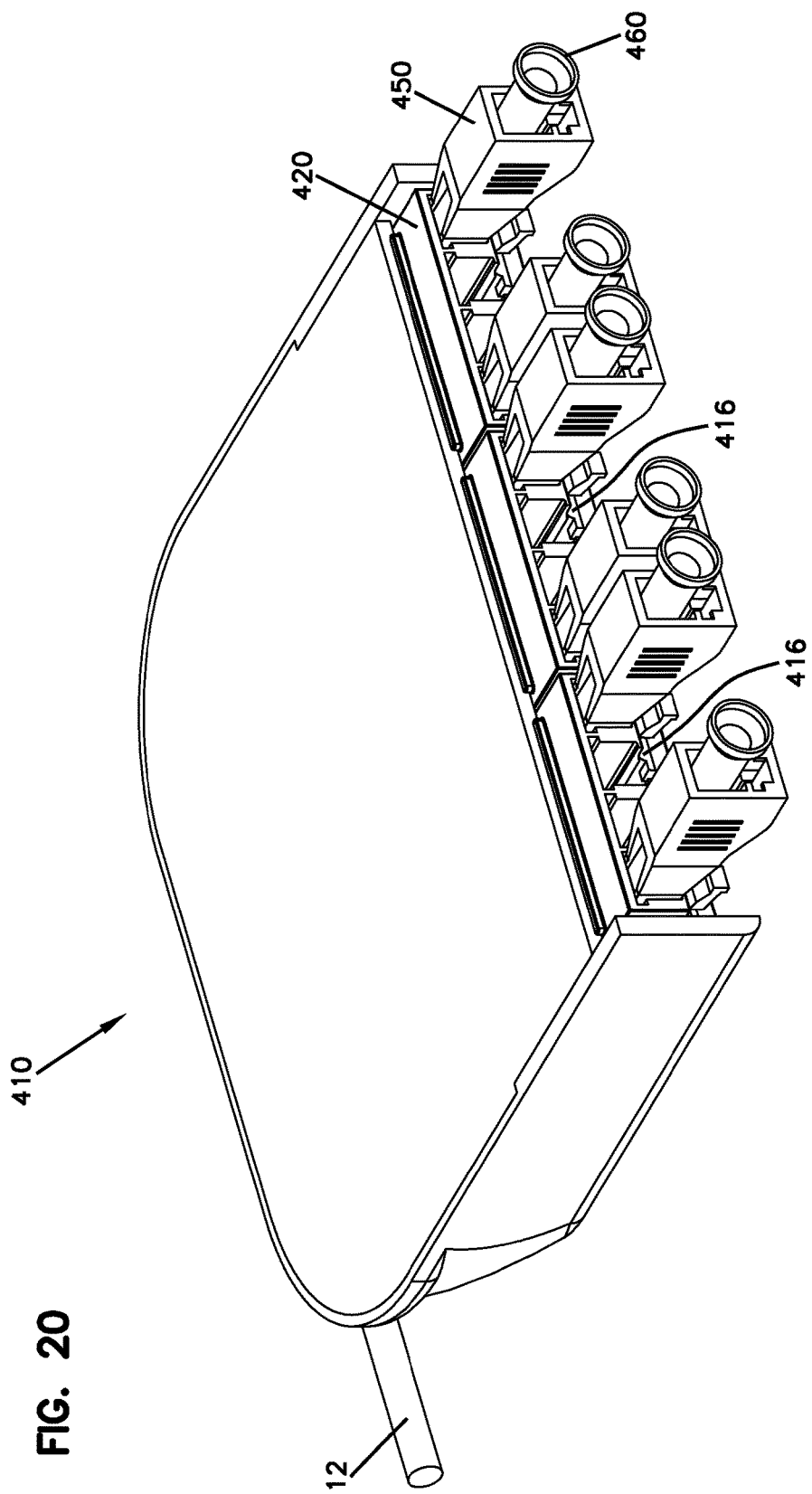
FIG. 20 is a fifth embodiment of a fiber optic cassette in accordance with the present invention, showing front ports sized for LC connectors, and also showing the use of attenuators in some of the ports.
Figure 21:
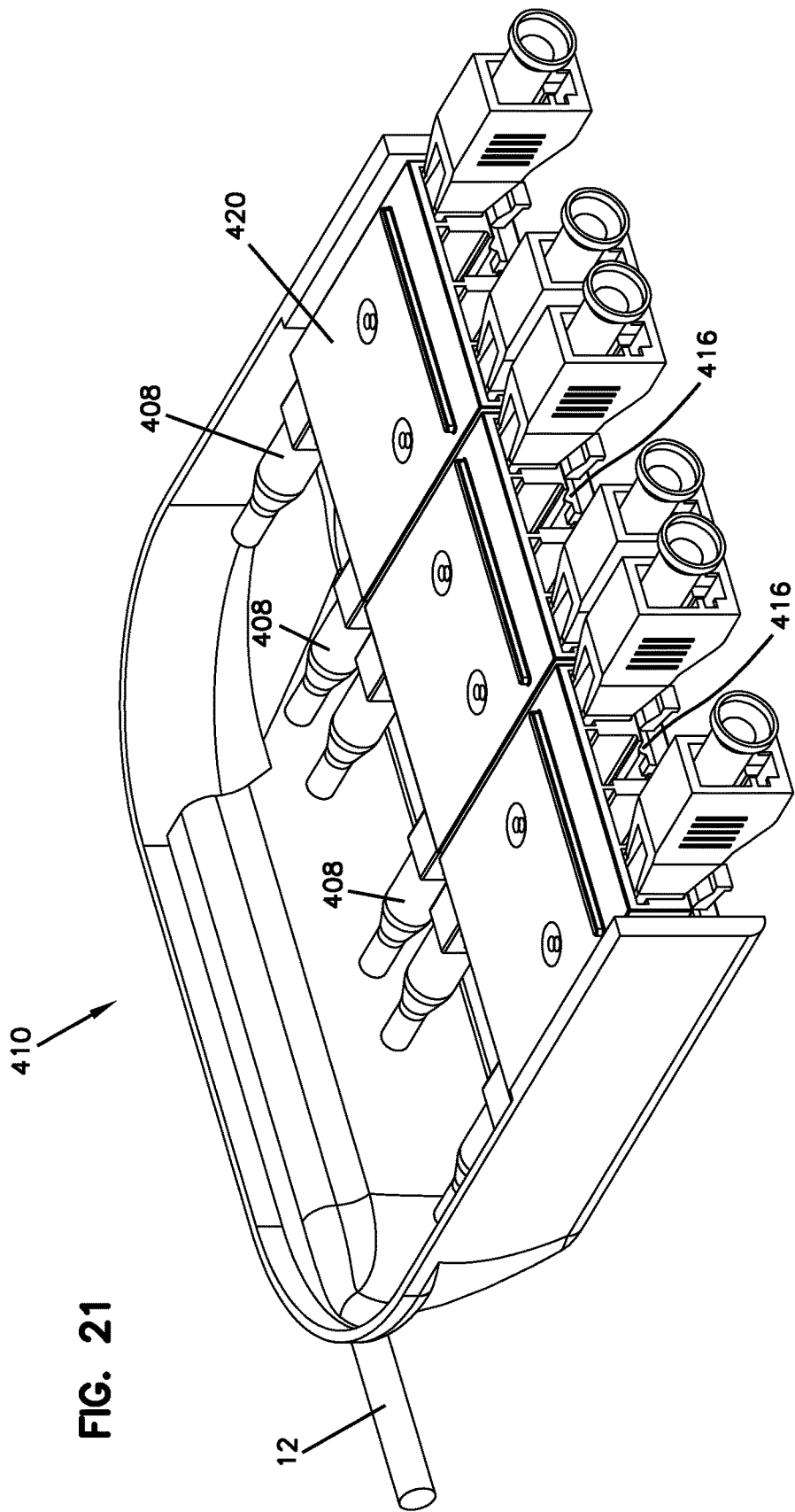
FIG. 21 is a view of the cassette of FIG. 20, with portions of the housing of the cassette removed.
Figure 22:
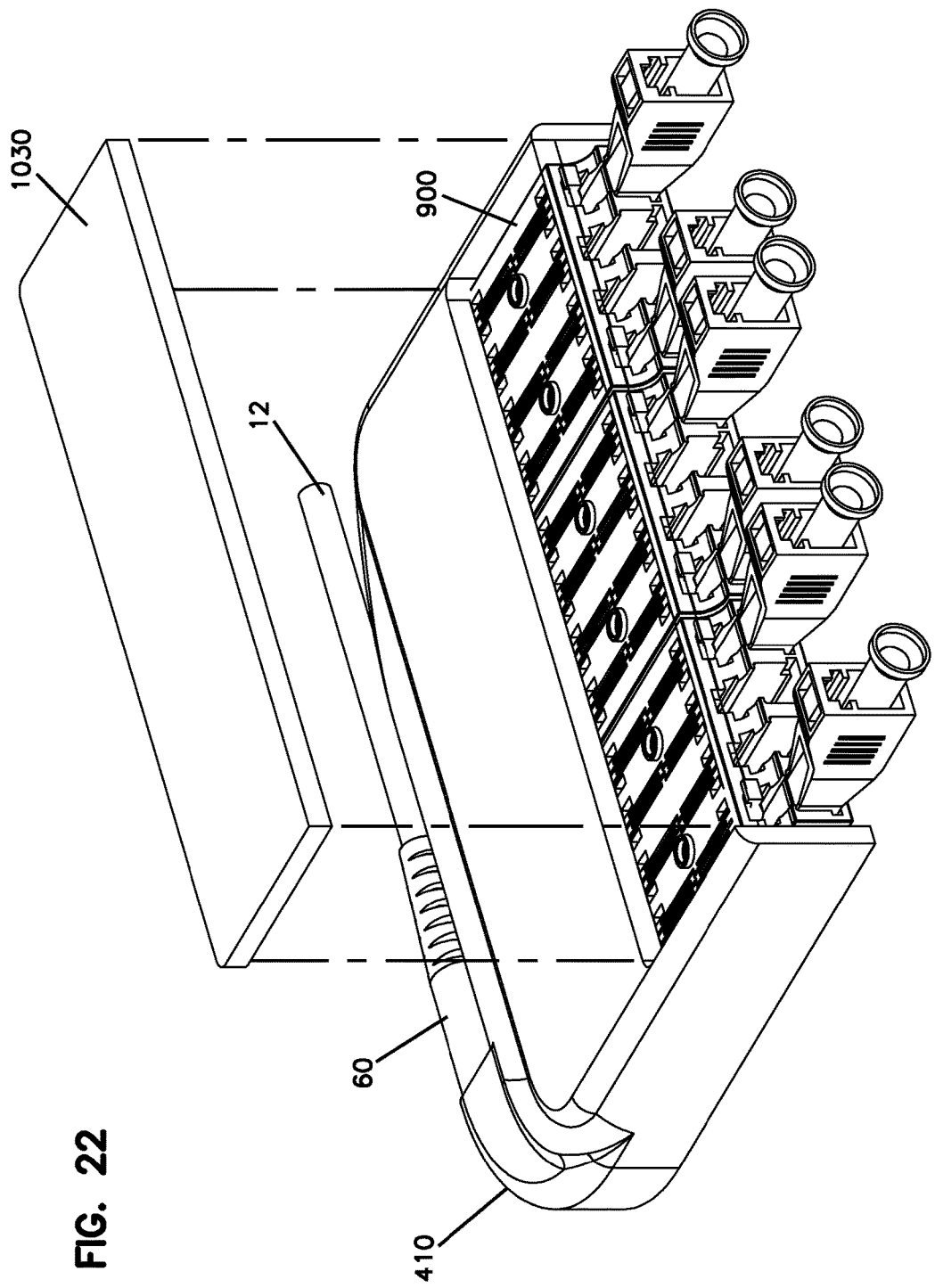
FIG. 22 is an opposite side view of the cassette of FIG. 20, with a circuit board shown removed from the housing.
Figure 23:
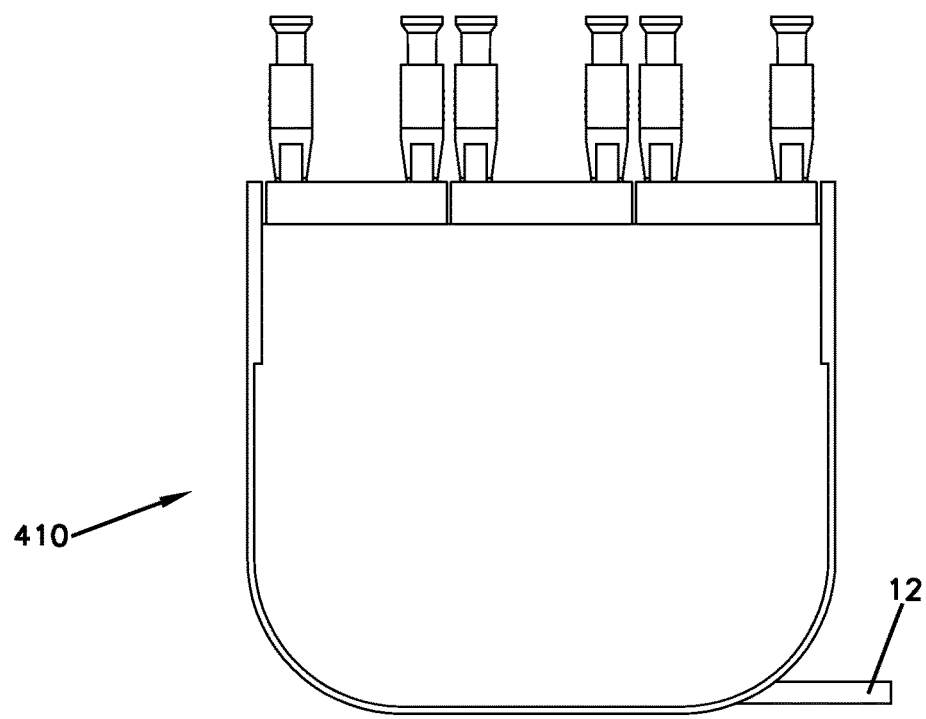
FIG. 23 is a first side view of the cassette of FIG. 20.
Figure 24:
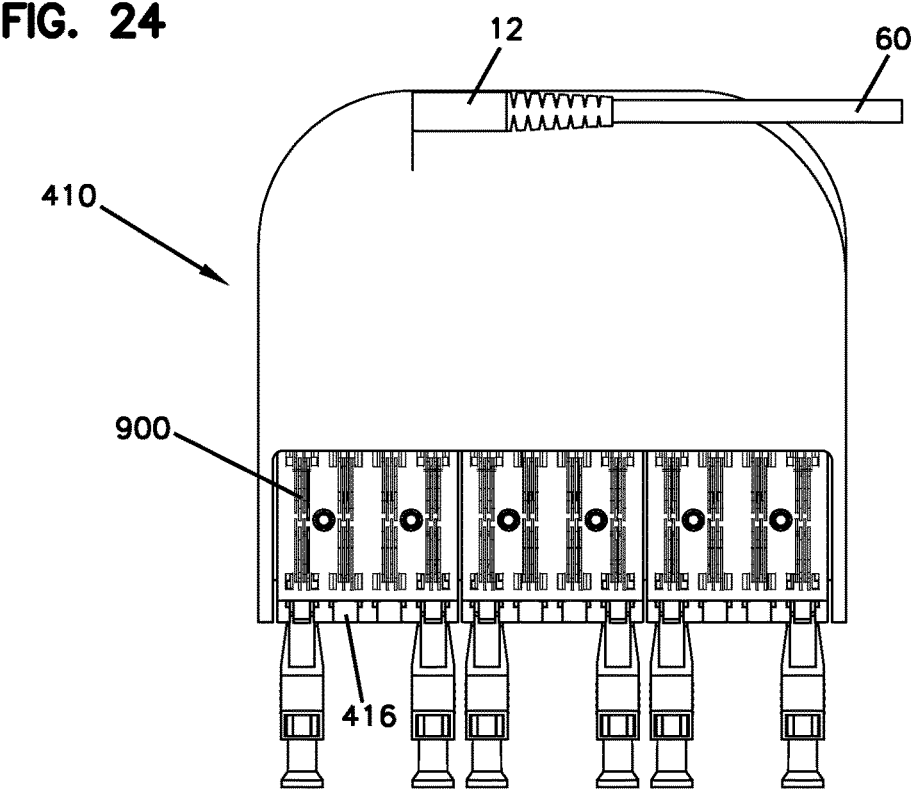
FIG. 24 is a second view of the cassette of FIG. 20.
Figure 25:
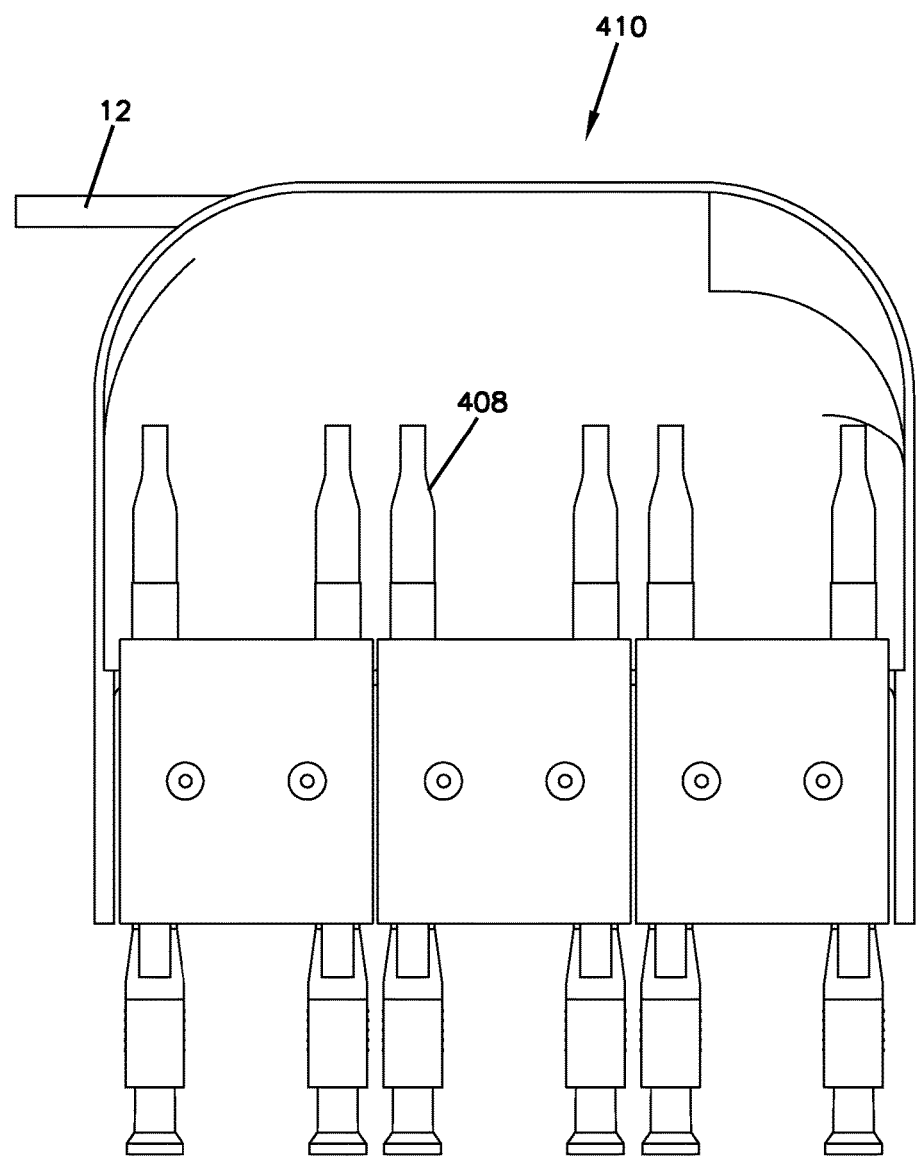
FIG. 25 is a further side view of the cassette of FIG. 20 with portions of the housing removed.
Figure 26:
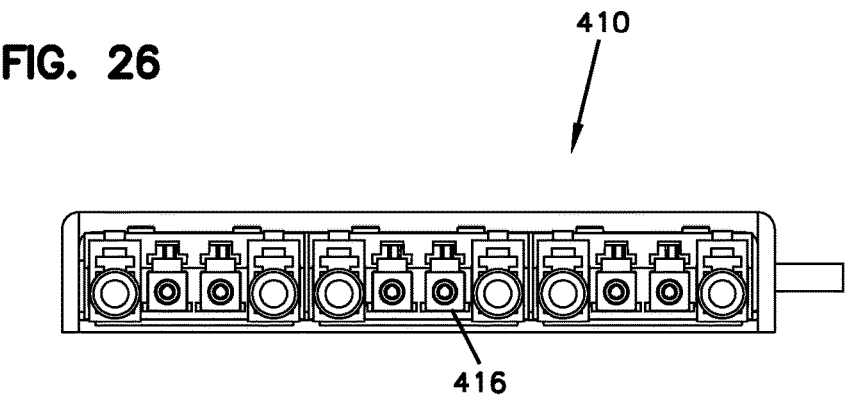
FIG. 26 is a front view of the cassette of FIG. 20.
Figure 27:
FIG. 27 is a further side view of the cassette of FIG. 20.

As will be described below, multiple rows of adapters 14 can be provided with cassette 10. See FIG. 32. In the illustrated embodiment, adapters 14 are sized to receive front SC connectors. LC connectors can be used with appropriate sized adapters. See FIGS. 9, 20, and 32.

Cable 12 is connected to cable entry location 44 with a crimp tube 70 and a crimp ring 72 which crimps jacket 50 and strength member 52 to crimp tube 70. A small pocket 76 captures crimp tube 70 for retention with cassette body 26. Pocket captures hex end 78 of crimp tube 70 to retain cable 12 with cassette body 26.

Disposed within interior 32 of cassette body 26 are a plurality of radius limiters 80 which provide cable bend radius protection for the fibers disposed within interior 32. Cable radius limiters 80 can be in the form of discrete interior structures, and/or curved exterior surfaces which form around the front 28, rear 30, and sides 38, 40.

Figure 8:
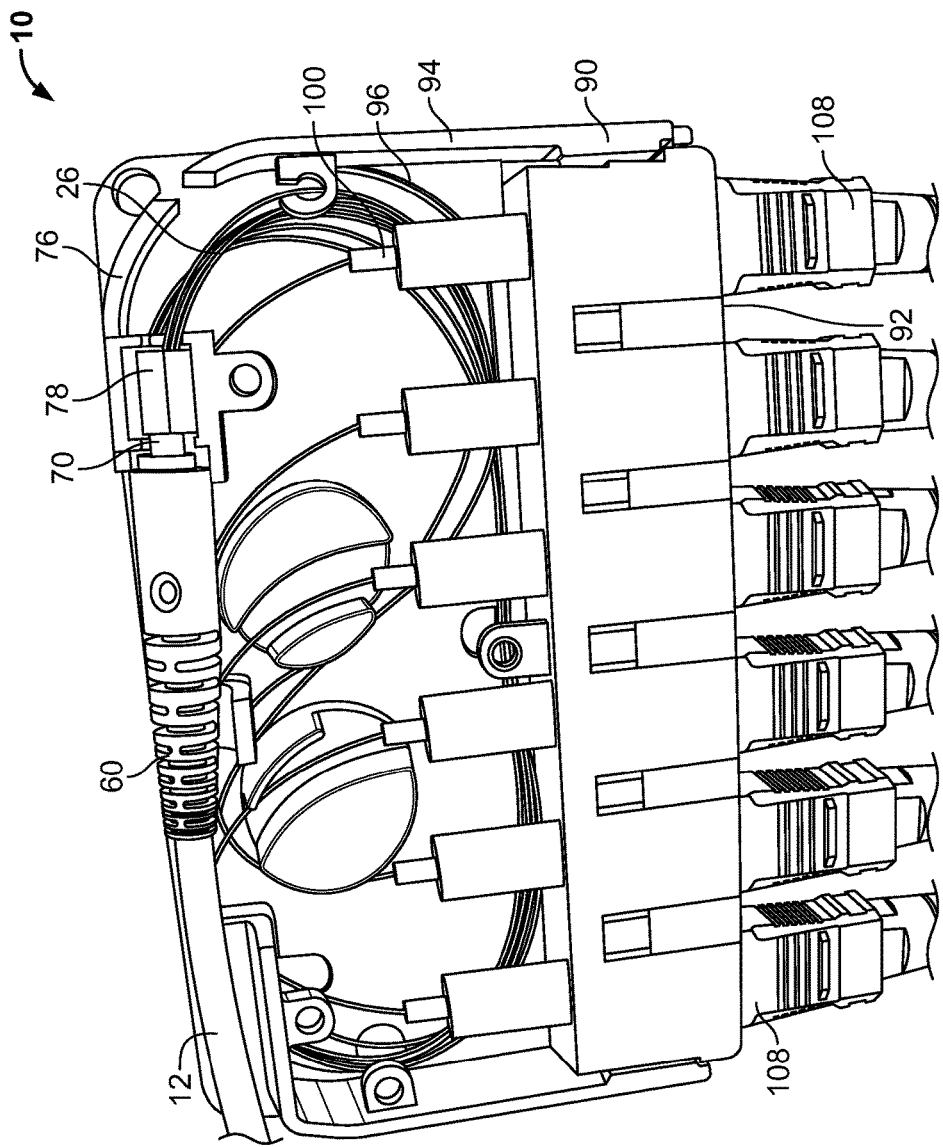
FIG. 8 shows an example cassette like the cassette of FIG. 1, showing example cabling extending from the input cable to the rear connectors of the adapter block.

In the illustrated embodiment, the adapters 14 are formed in a block construction 90 having a front end 92, and an opposite rear end 94. Front end 92 includes a profile for receiving SC connectors 108. Front end 92 includes SC clips 96 for clipping to an SC connector. Adapter block 90 also includes a rear clip 98 which clips to a hub and ferrule 100 (hub 104 mounted to ferrule 106) which terminates each fiber 20 exposed within interior 32 of cassette 10. Hub and ferrule 100 form a rear connector. A split sleeve 102 is also provided for ferrule alignment between hub and ferrule 100 (rear connector) and the ferrule of the front SC connector 108. As shown in FIG. 8, fibers 20 are provided with excess length between crimp tube 70, and the rear connector defined by the termination at hub and ferrule 100. Severe bending of the fibers is to be avoided. In the illustrated embodiment, the small size of the cassette 10 requires that some fibers 20 reverse direction via limiters 80.

Figure 9:
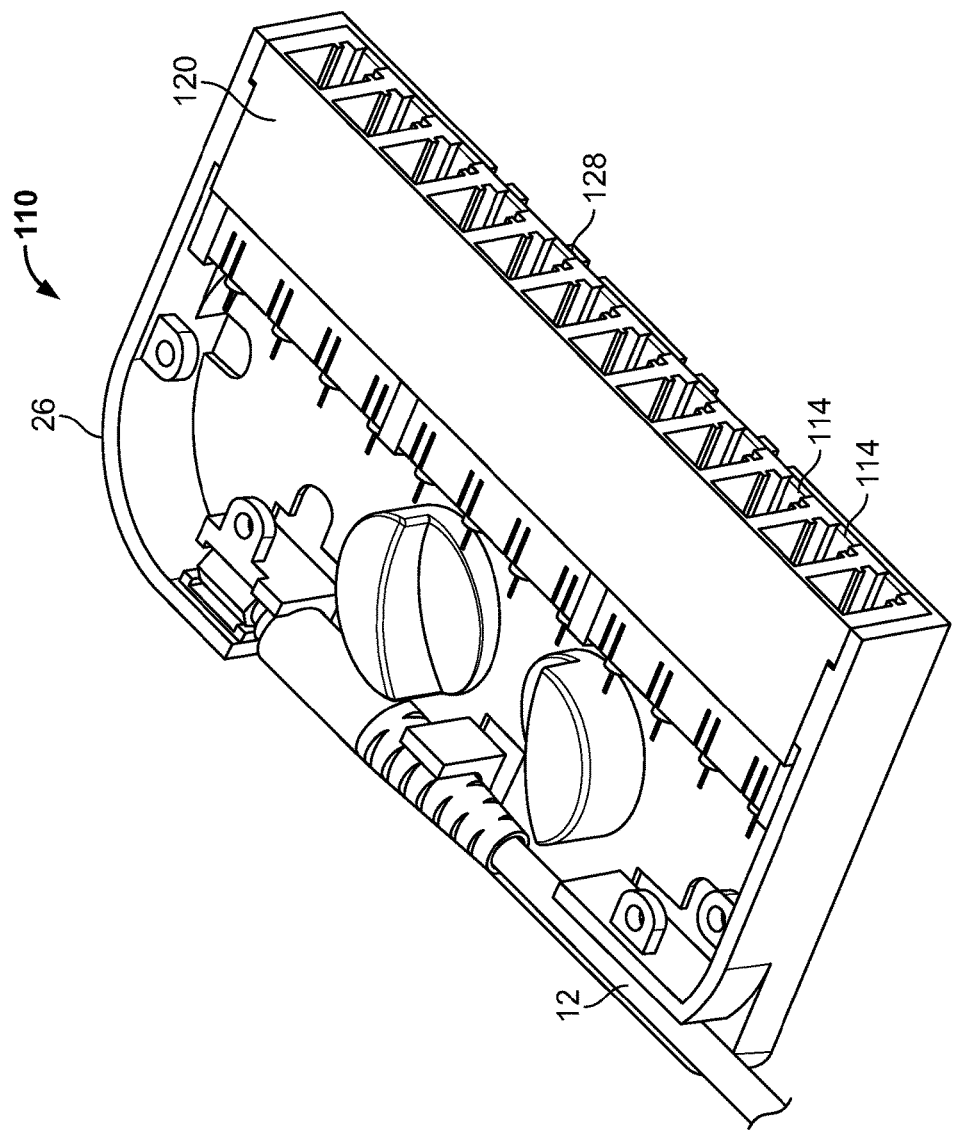
FIG. 9 shows a second embodiment of a fiber optic cassette for receipt of LC connectors in a front of the adapter block.

Referring now to FIG. 9, cassette 110 is constructed in a similar manner as cassette 100 except that the adapters 114 are sized to receive LC connectors at front 128. The hub and ferrule is made correspondingly smaller to accommodate the LC front connectors. Adapters 114 are preferably formed as a block 120.

In FIGS. 1-9, blocks 90, 120 are snap fit or otherwise attached to a rest of body 26. A cover 48 covers a rear area behind blocks 90, 120. The cassettes 10, 110 can be sealed or they can be openable, so as to allow repair, or cleaning of the inner hub and ferrule 100. In some cases, blocks 90, 120 can be snap fit to a rest of the housing 26 for ease of assembly. Blocks 90, 120 can also preferably be removed from a rest of the cassette 10, 110 to allow for cleaning of the inner connector. The inner fiber slack allows for blocks 90, 120 to be pulled a short distance away from the rest of the cassette 10, 110.

Figure 10:
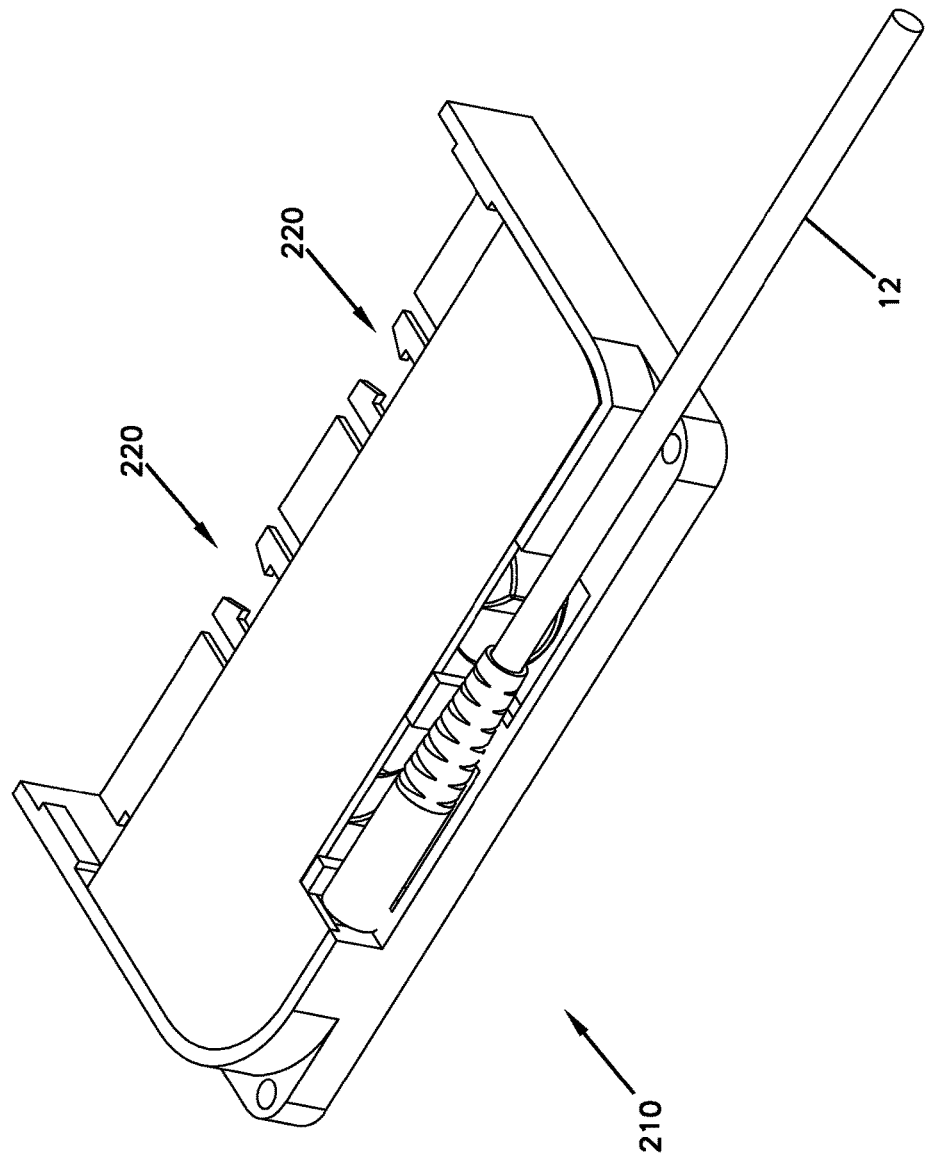
FIG. 10 shows a third embodiment of a fiber optic cassette in accordance with the present invention without the front adapter block.
Figure 11:
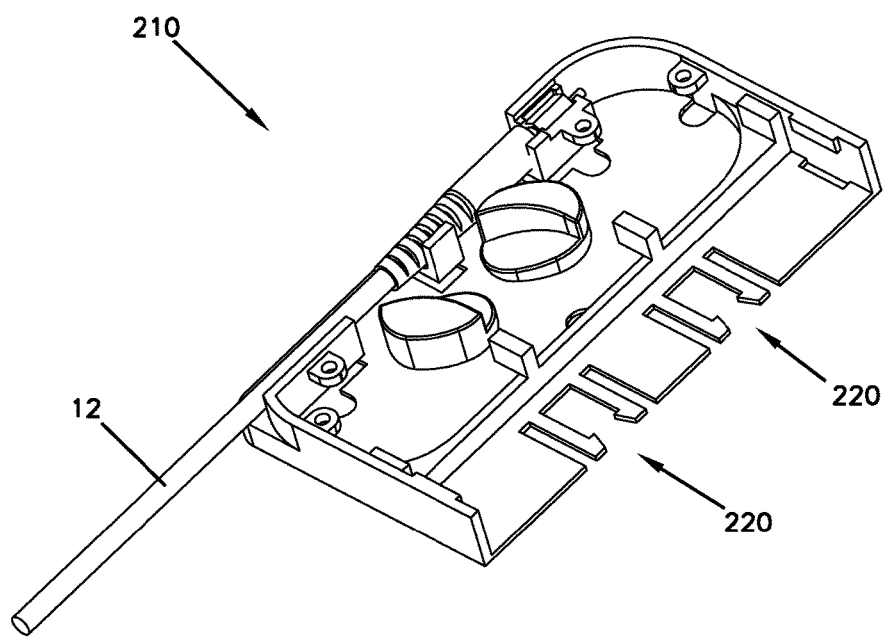
FIG. 11 shows a further perspective view of the cassette of FIG. 10, with portions of the housing removed.
Figure 12:
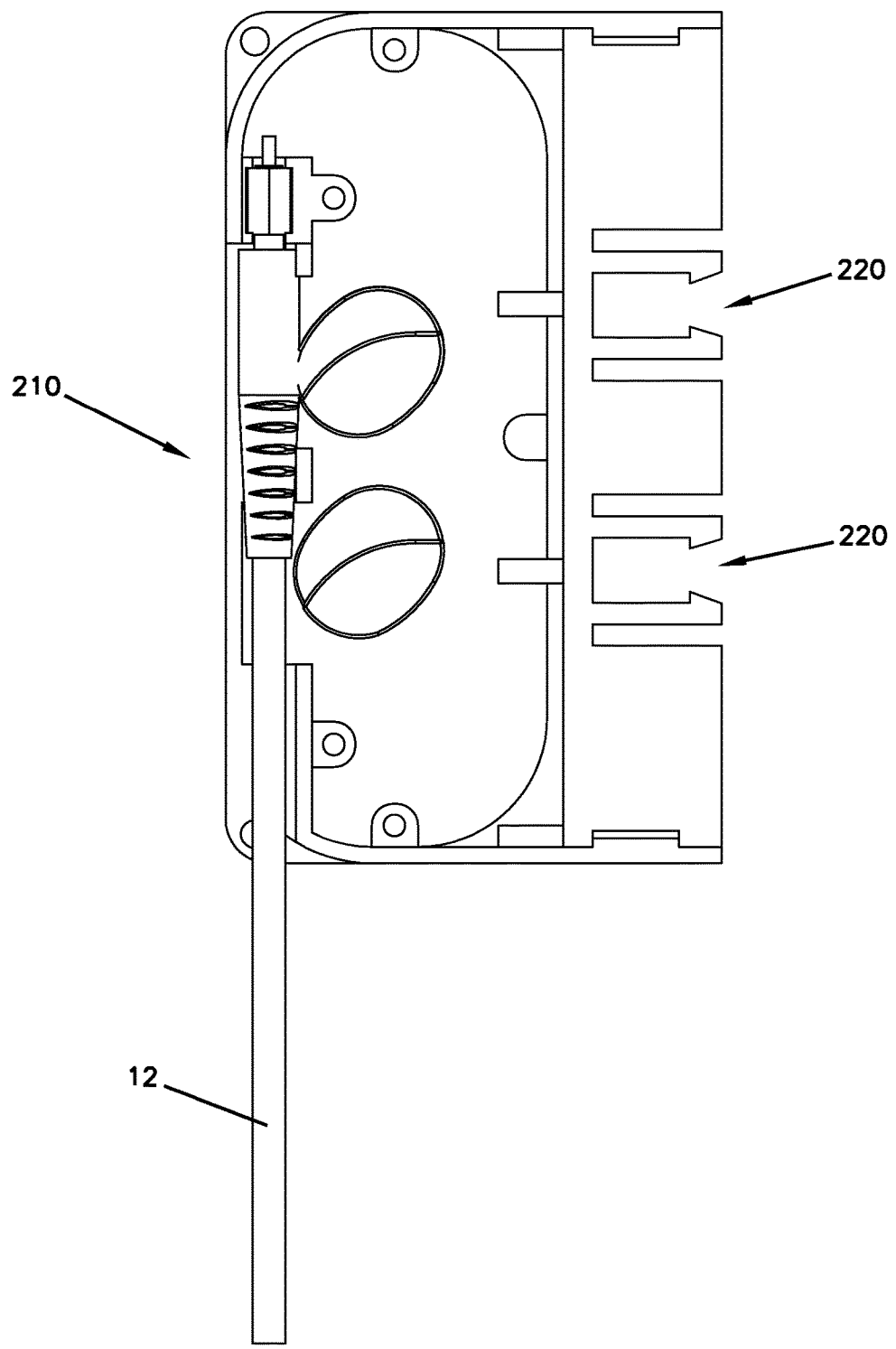
FIG. 12 is a top view of the cassette of FIG. 11.
Figure 13:
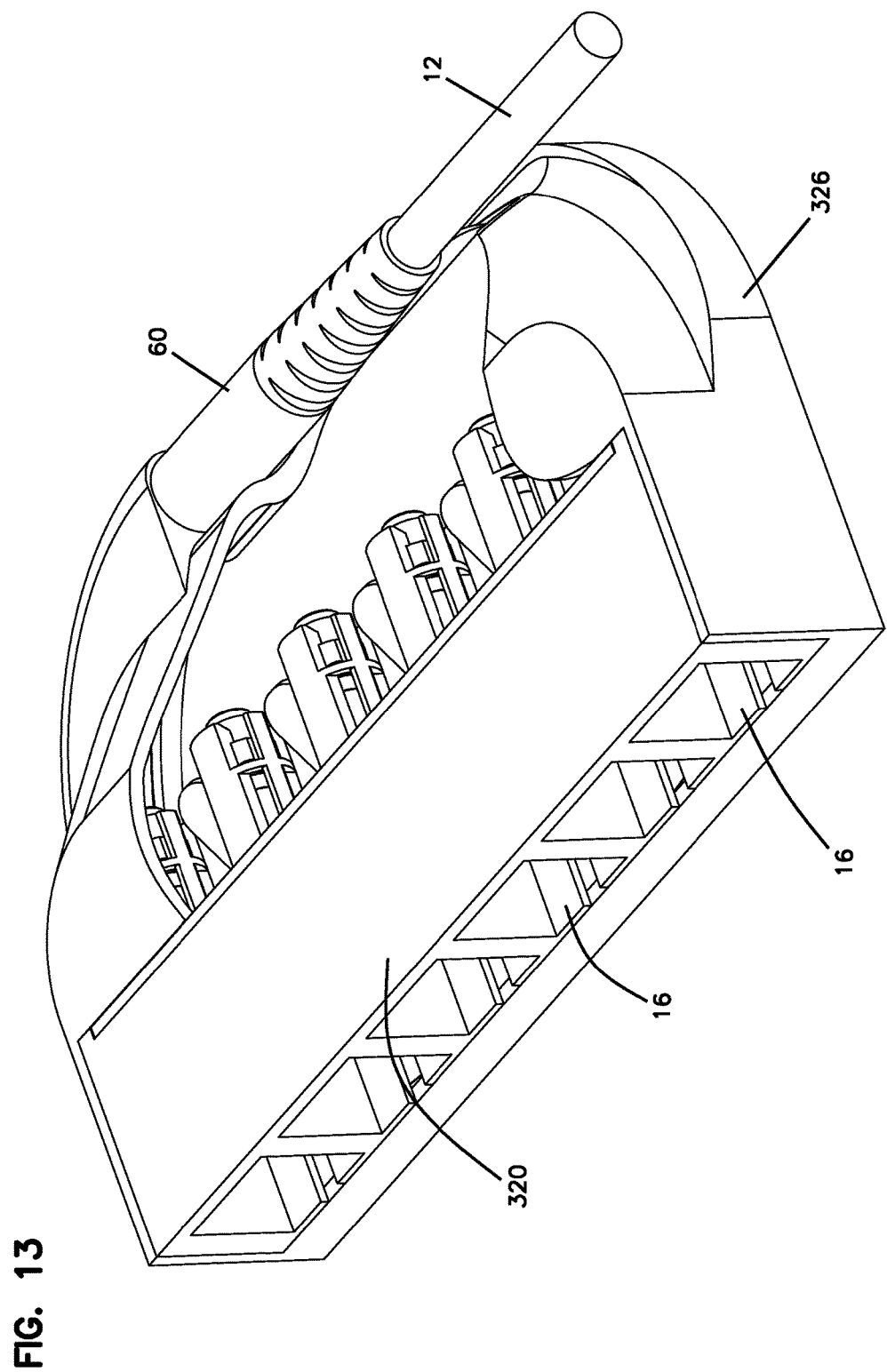
FIG. 13 shows a fourth embodiment of a fiber optic cassette with portions of the housing removed.
Figure 14:
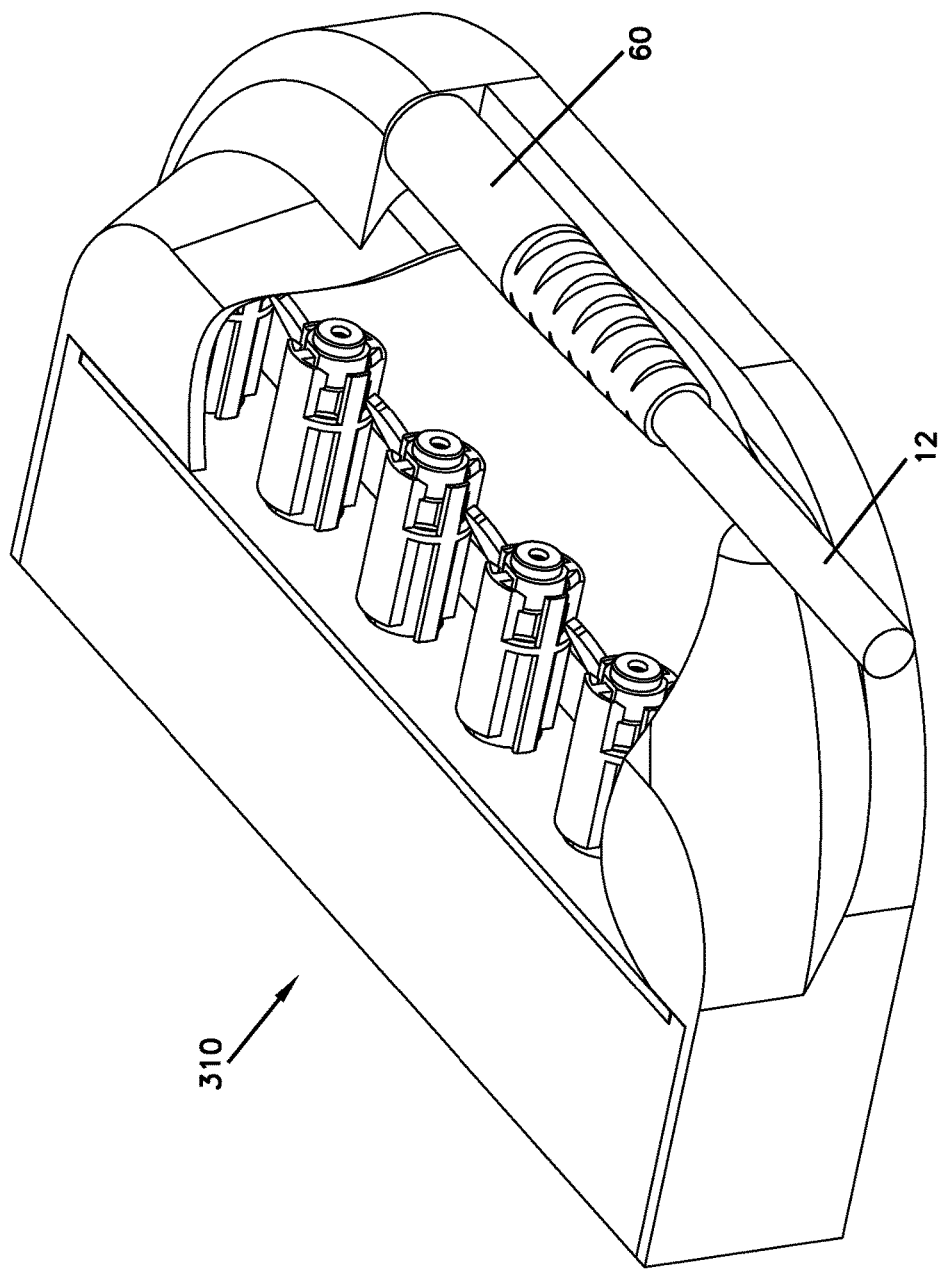
FIG. 14 shows a further perspective view of the cassette of FIG. 13.
Figure 15:
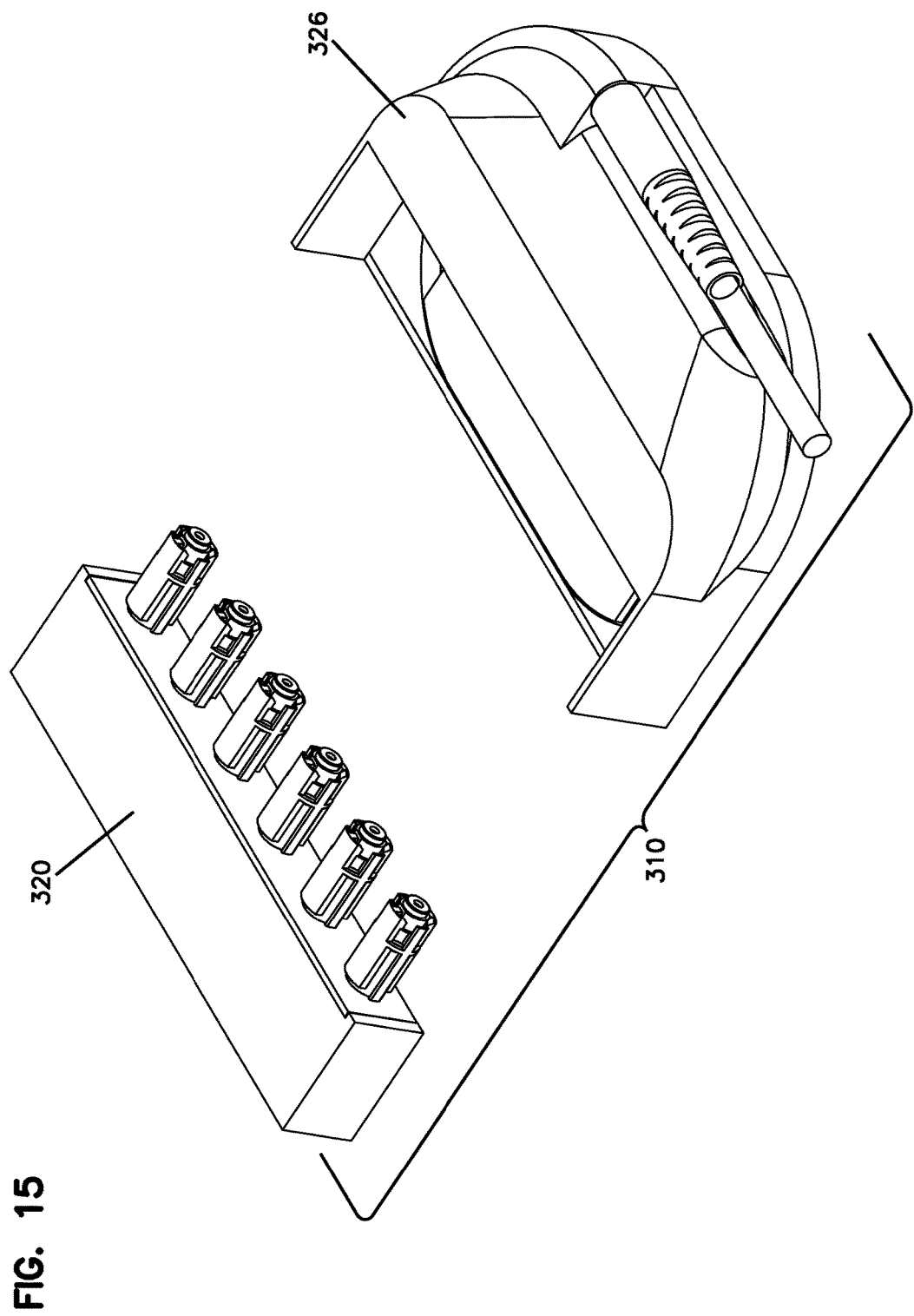
FIG. 15 shows the cassette of FIG. 13 in exploded view with the adapter block separate from a remainder of the cassette housing.
Figure 16:
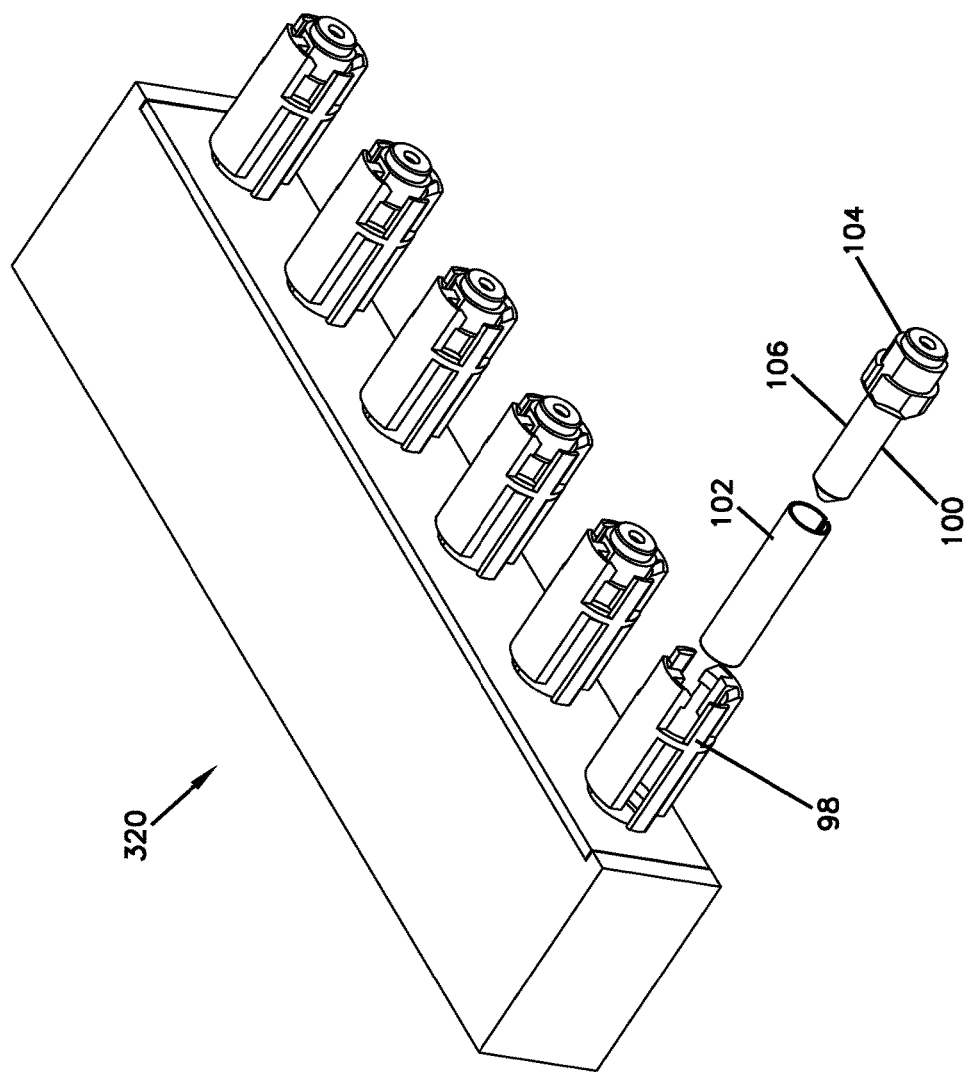
FIG. 16 shows an exploded view of the adapter block with the split sleeve and the rear connector removed from the adapter block.
Figure 17:
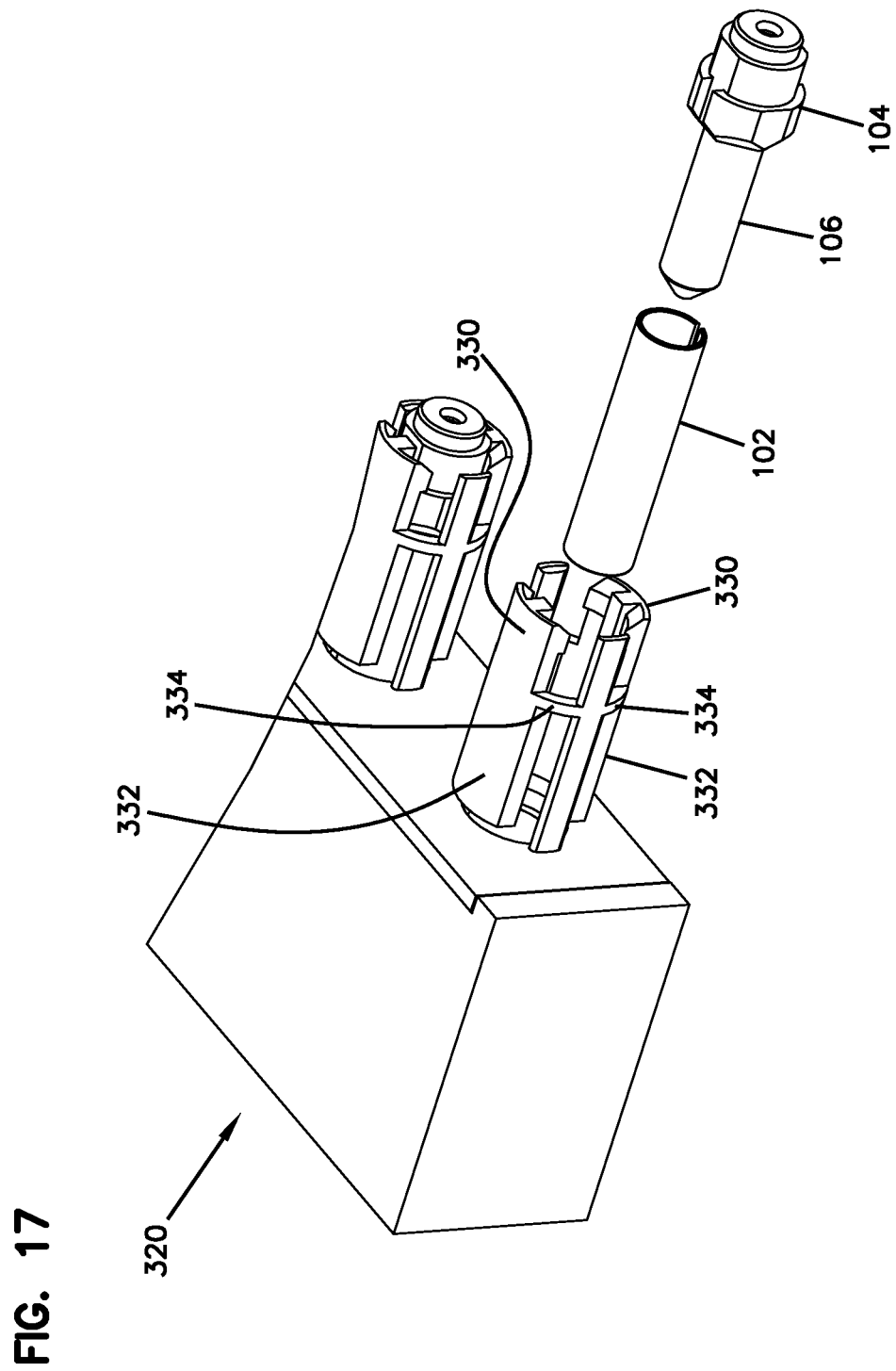
FIG. 17 is an enlarged view a portion of the view of FIG. 16.
Figure 18:
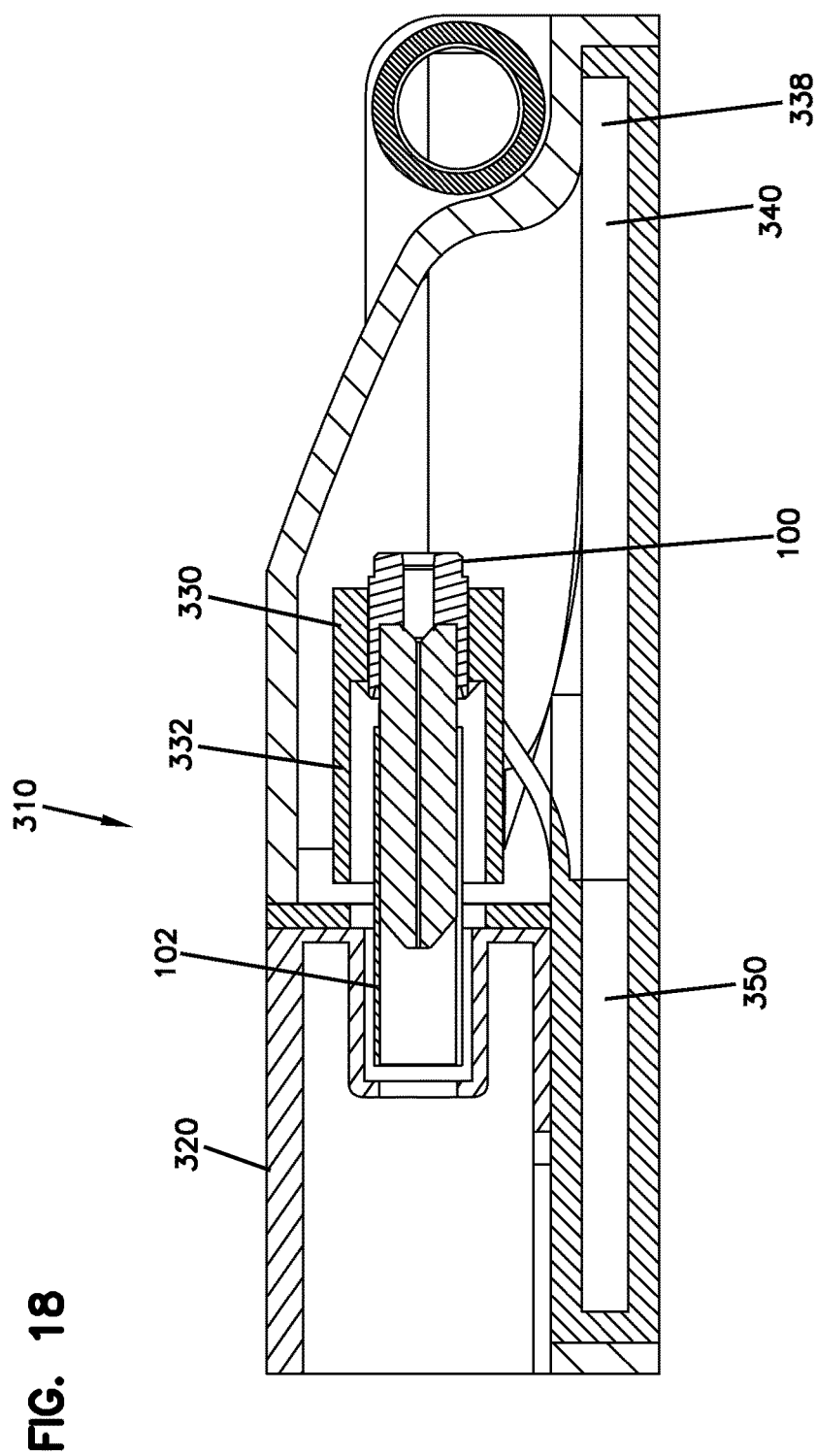
FIG. 18 is a cross-sectional view through one of the adapter ports of the cassette of FIG. 13.
Figure 19:
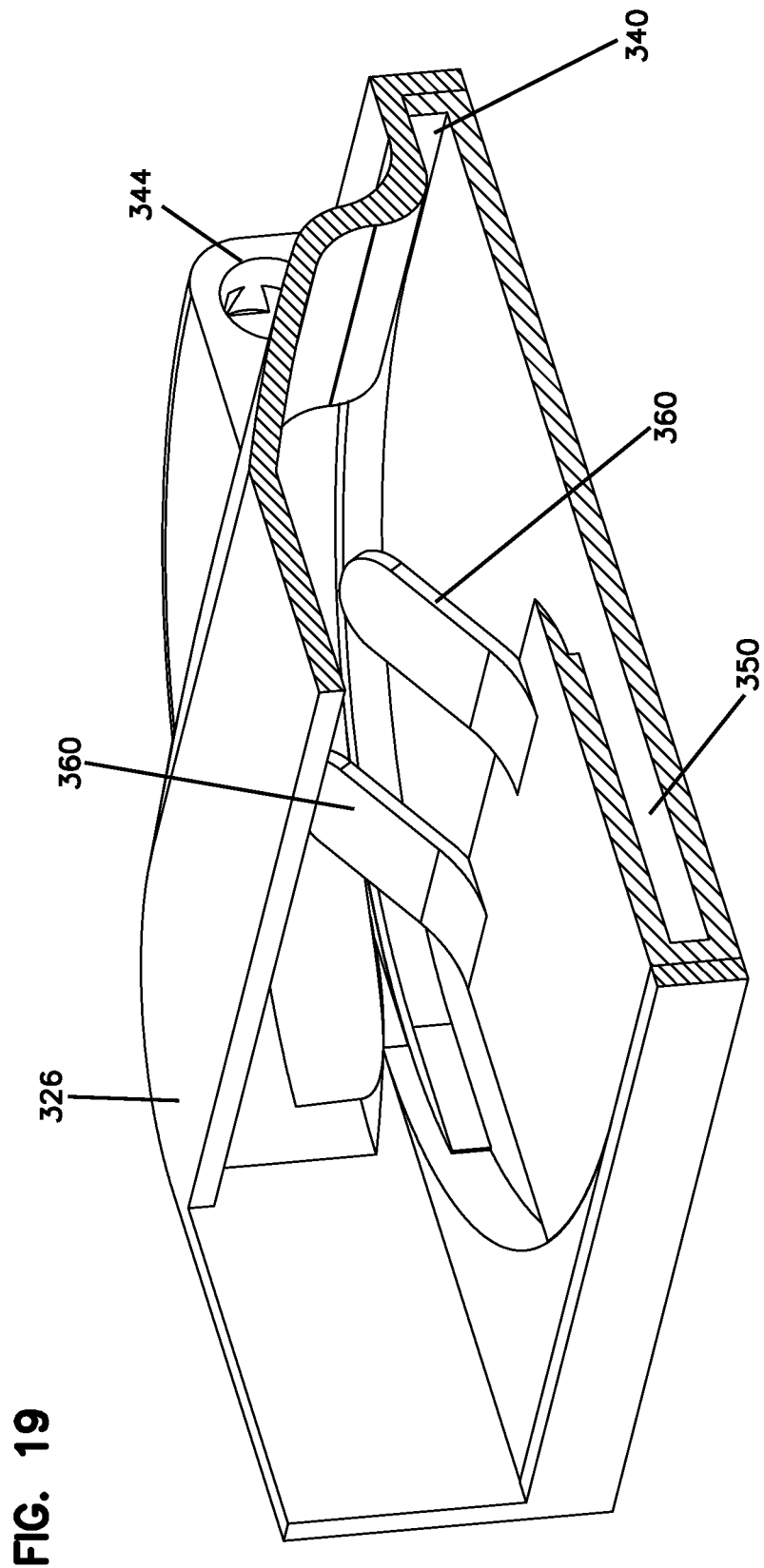
FIG. 19 is a cross-sectional perspective view of the rear portion of the housing of the cassette of FIG. 13.

FIGS. 10-12 show a third embodiment of a fiber optic cassette in accordance with the present invention without the front adapter block. Front clips 220 are used to clip to the adapter blocks 90, 120, and engage projecting posts on the blocks.

Another embodiment of a fiber optic cassette 310 is shown in FIGS. 13-19. Cassette 310 includes a cable 12, a boot 60 and a cable entry location 344 in a similar location as cassettes 10, 110, 210. Cassette 310 includes a removable adapter block 320, separatable from the rest of body 326. Once removed, module 320 allows rear hub and ferrule 100 to be removed in a similar manner as in cassettes 10, 110, 210. Rear clip 98 includes two clip members 330 which clip onto hub and ferrule 100. To release, tabs 332 are pressed together which causes an outward pivot of clip members 330 about pivot members 334, thereby allowing removal of hub and ferrule 100 for cleaning. Split sleeve 102 may be retained on ferrule 106 during the removal process, and would need to be removed to clean the ferrule tip.

Cassette 310 also includes a pocket 338 for slack storage of fibers. Pocket 338 is formed with rounded outer surfaces 338 in body 326, and rounded outer surfaces 350 in adapter block 320. Tabs 360 help facilitate positioning of the fiber storage loops in pocket 338, during assembly and later removal of block 320, by directing the loops downward.

Referring now to FIGS. 20-27, a further alternative embodiment of a cassette 410 is shown. One difference between the cassette 310 of FIGS. 13-19 and cassette 410 is that an interior of the adapter blocks 420 are sized to receive traditional connectors such as SC or LC. In the example embodiment, the adapters are sized to receive LC connectors 408. In this embodiment of a fiber optic cassette, front ports 416 are sized for LC connectors, and show the use of attenuators 450 (with dust caps 460) in some of the ports 416.

Figure 28:
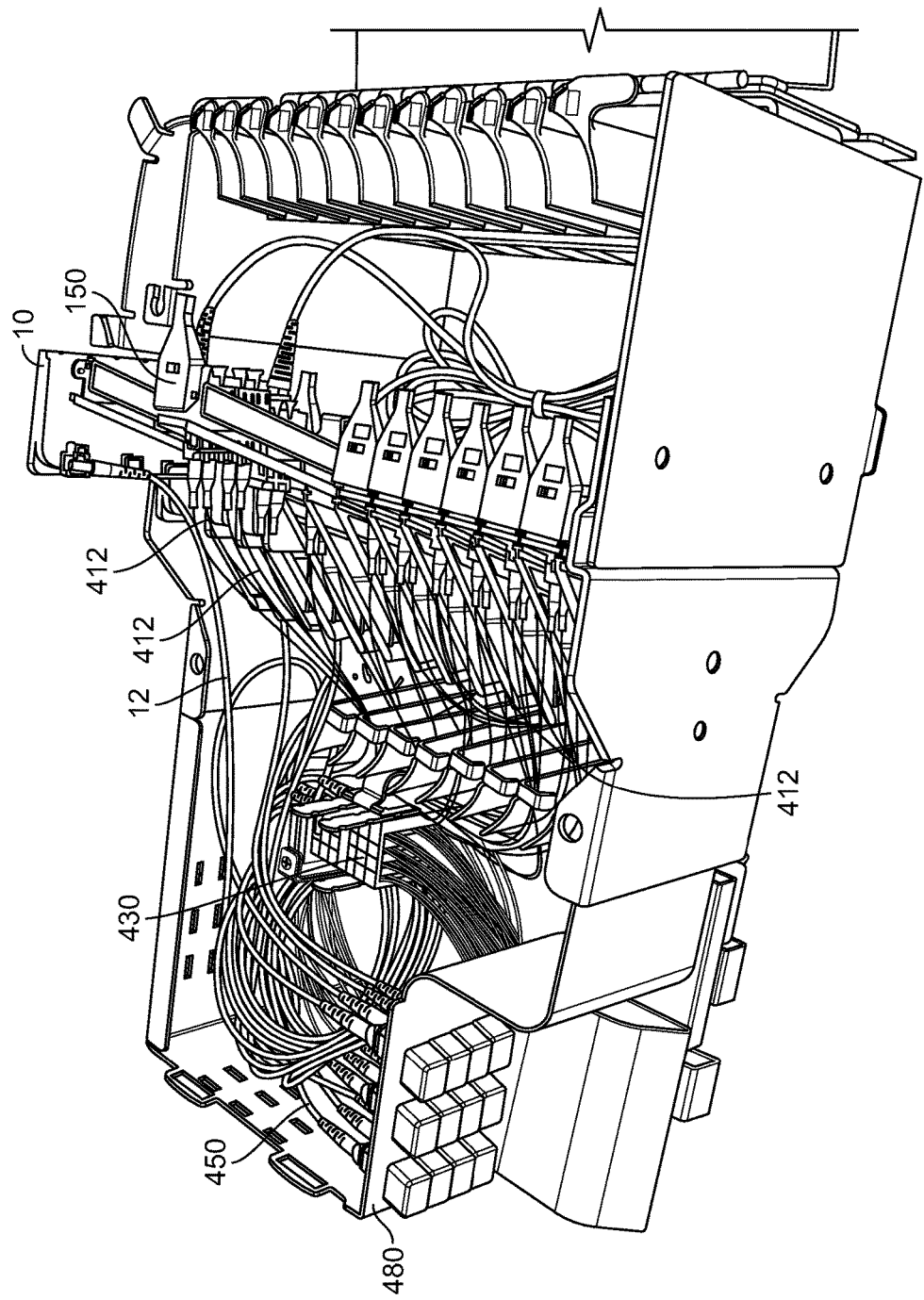
FIG. 28 shows a cassette mounted for sliding movement relative to a chassis.

Referring now to FIG. 28, cassette 10 is shown mounted in a chassis for relative movement to the chassis along a sliding direction for access. For comparison, cassette 10 includes a single input cable which connects to a rear MPO panel 480. Similar high-density distribution frames or blocks are described in U.S. Pat. No. 6,591,051, the disclosure of which is incorporated by reference. It should be noted that the cassettes described herein may be used in a sliding packs in a telecommunications rack such as that described in U.S. Pat. No. 6,591,051, incorporated herein by reference in its entirety, or in other drawers and fixtures. Sliding adapter packs 150 such as shown in FIG. 28 are shown with a plurality of individual fibers extending to a fanout 430 which then has a cable 450 that leads to MPO panel 480. Cassettes 10 allow for only single cable 12 to be handled, saving space and installation time.

Figure 29:
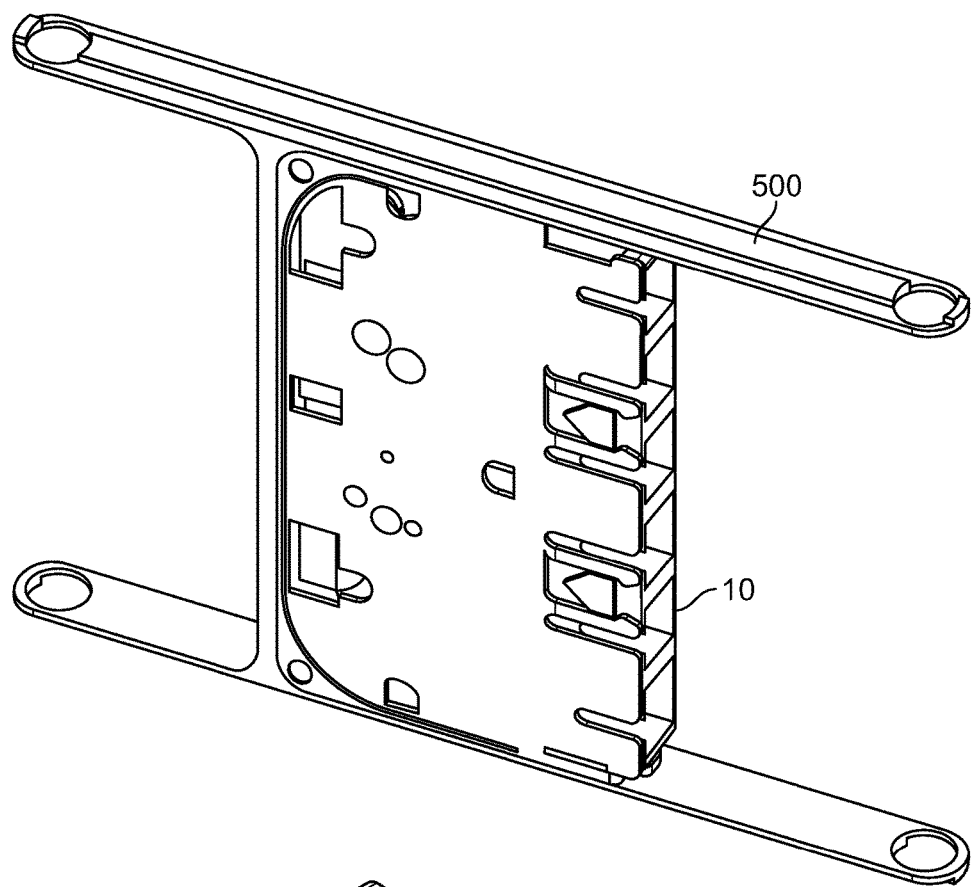
FIG. 29 shows a cassette mounted in a housing.
Figure 30:
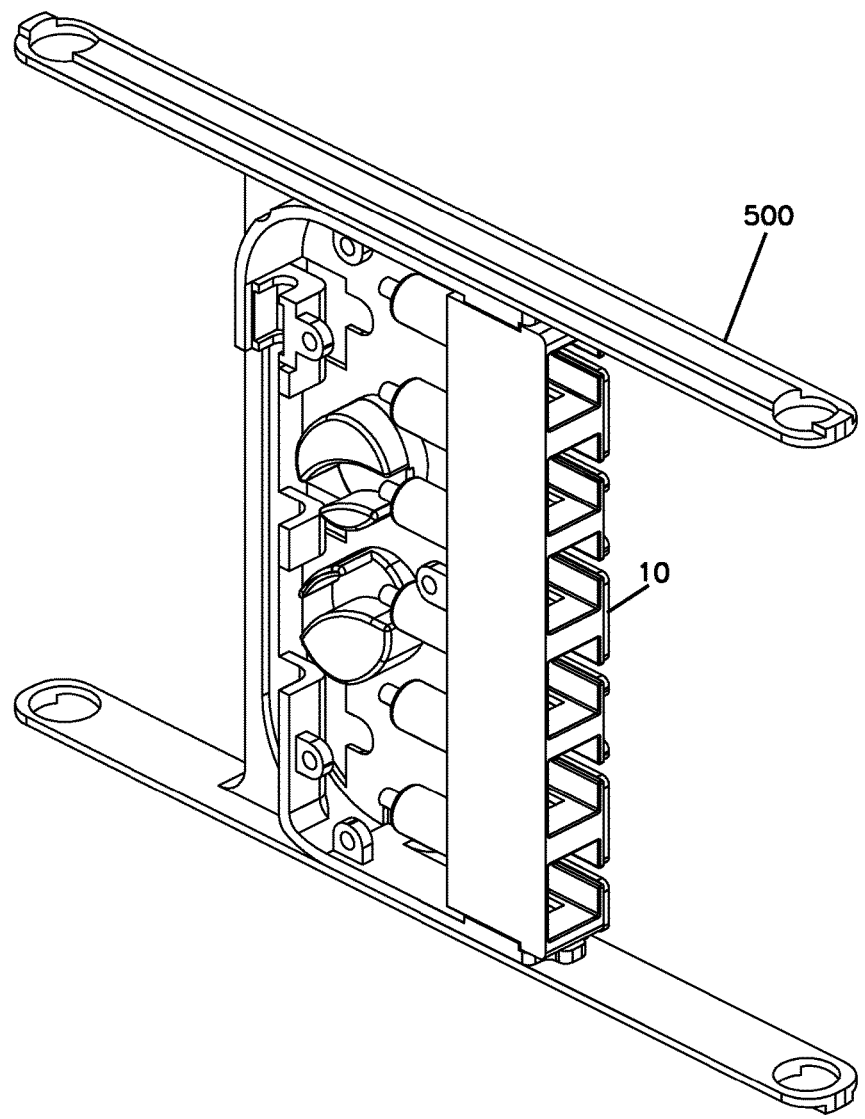
FIG. 30 shows another view of the cassette and housing of FIG. 29 with portions of the housing removed.
Figure 31:
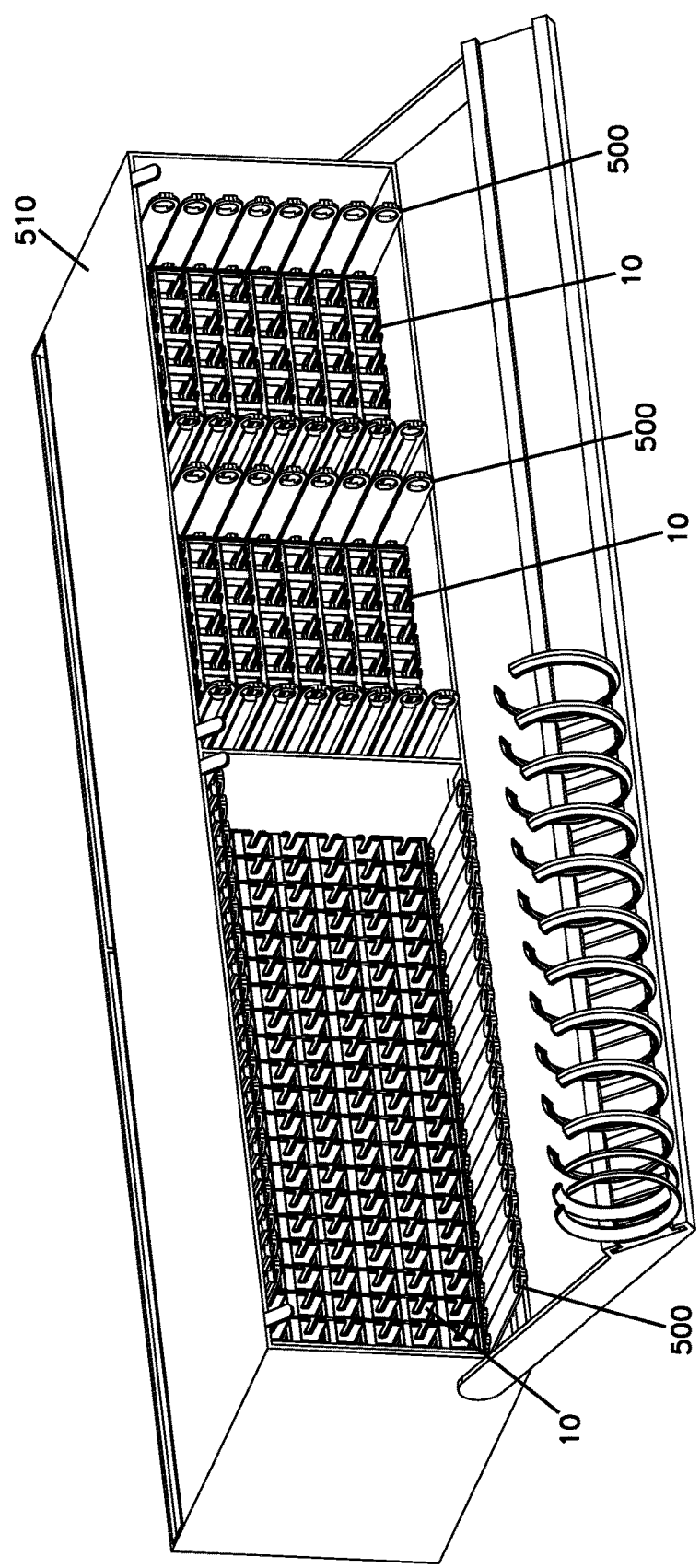
FIG. 31 shows the housing of FIGS. 29 and 30 mounted vertically and horizontally in different portions of the chassis.

Referring now to FIGS. 29-31, cassette 10 is shown mounted to a housing 500, wherein the housing is received in a chassis 530. FIG. 31 shows the housing 500 of FIGS. 29 and 30 mounted vertically and horizontally in different portions of the chassis 530. Preferably, housing 500 is slideably movable to access a selected cassette 10.

Figure 32:
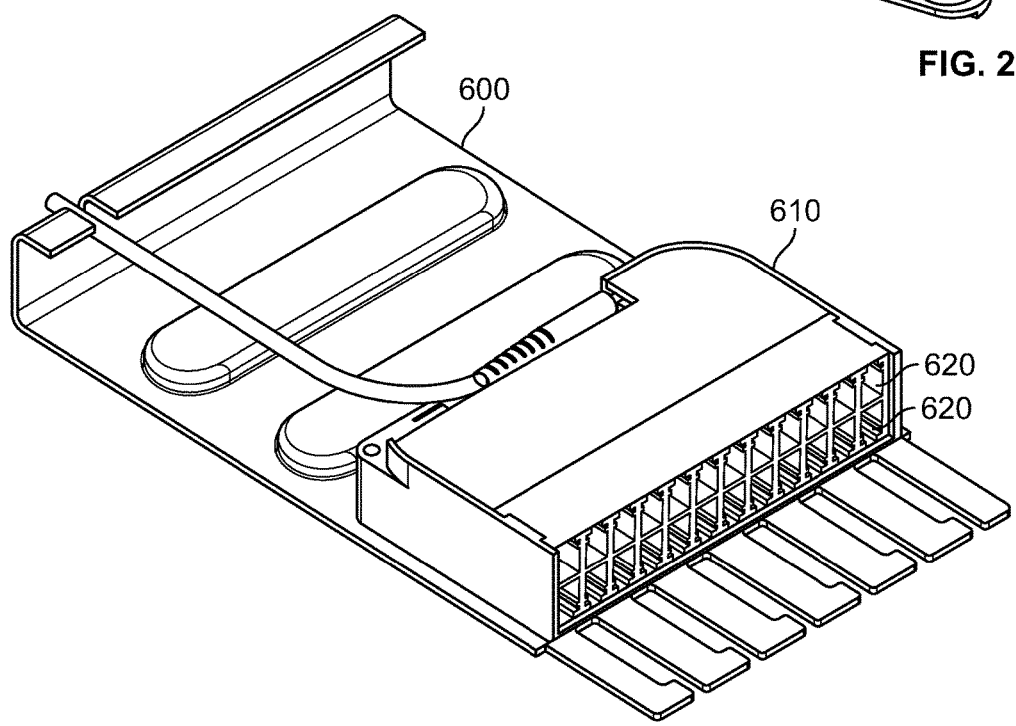
FIG. 32 shows a cassette mounted on another housing.
Figure 33:
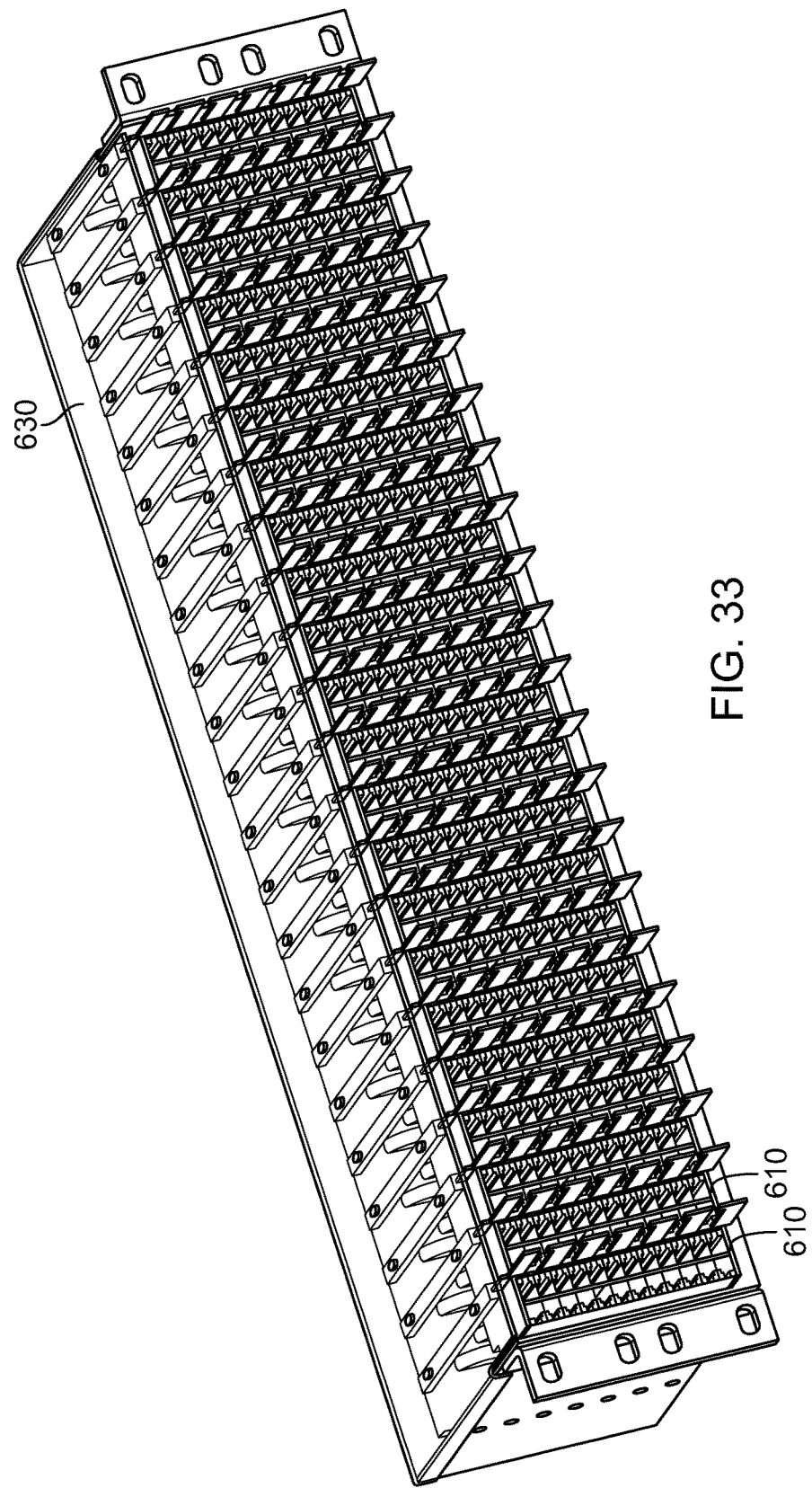
FIG. 33 shows the housing of FIG. 32 mounted in a chassis.

Referring now to FIGS. 32 and 33, an alternative embodiment of a cassette 610 is mounted to a further housing 600 which is received in a chassis 630. Cassette 610 includes two rows of front adapters sized for LC connectors.

Figure 34:
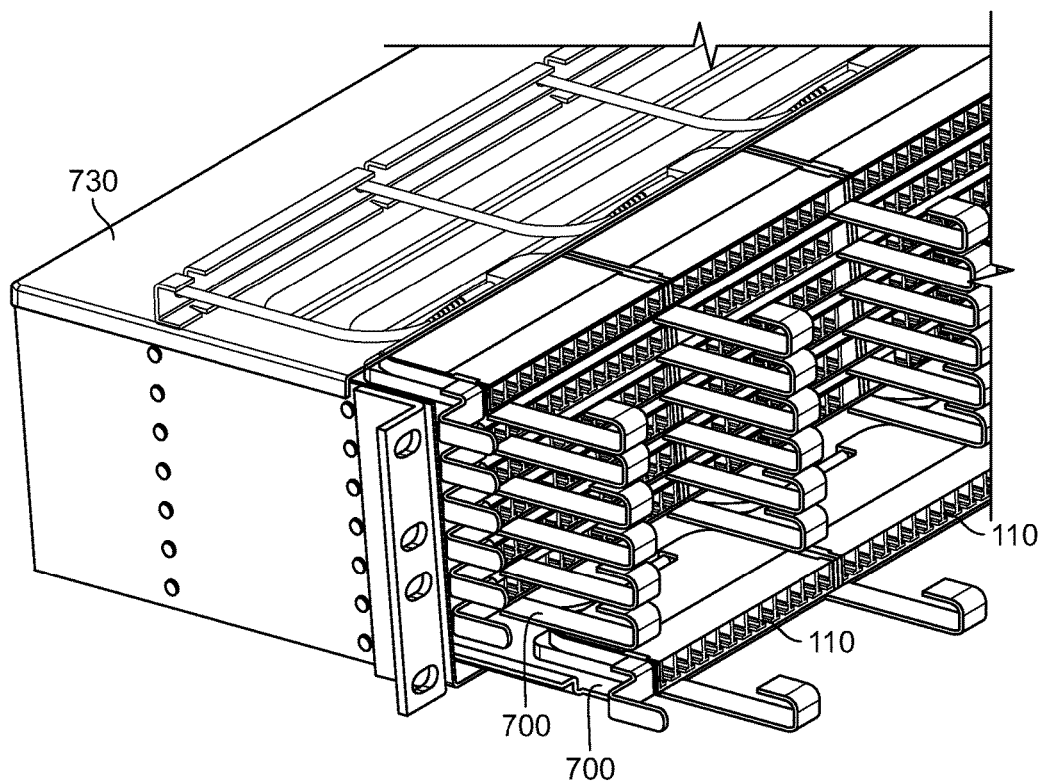
FIG. 34 shows a cassette mounted on another housing which is slidably mounted relative to a chassis.
Figure 35:
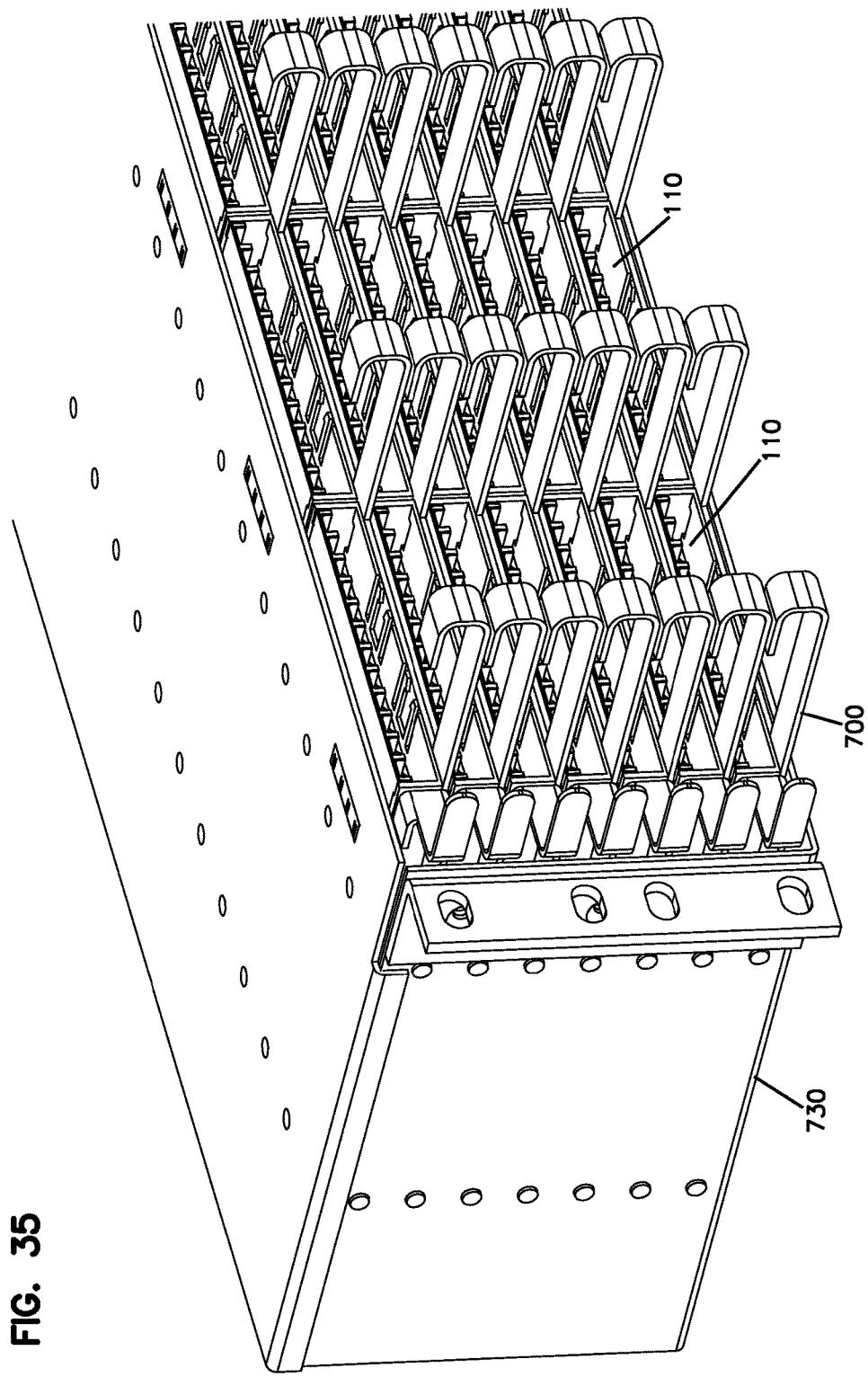
FIGS. 35 and 36 show further views of the chassis of FIG. 34.
Figure 36:
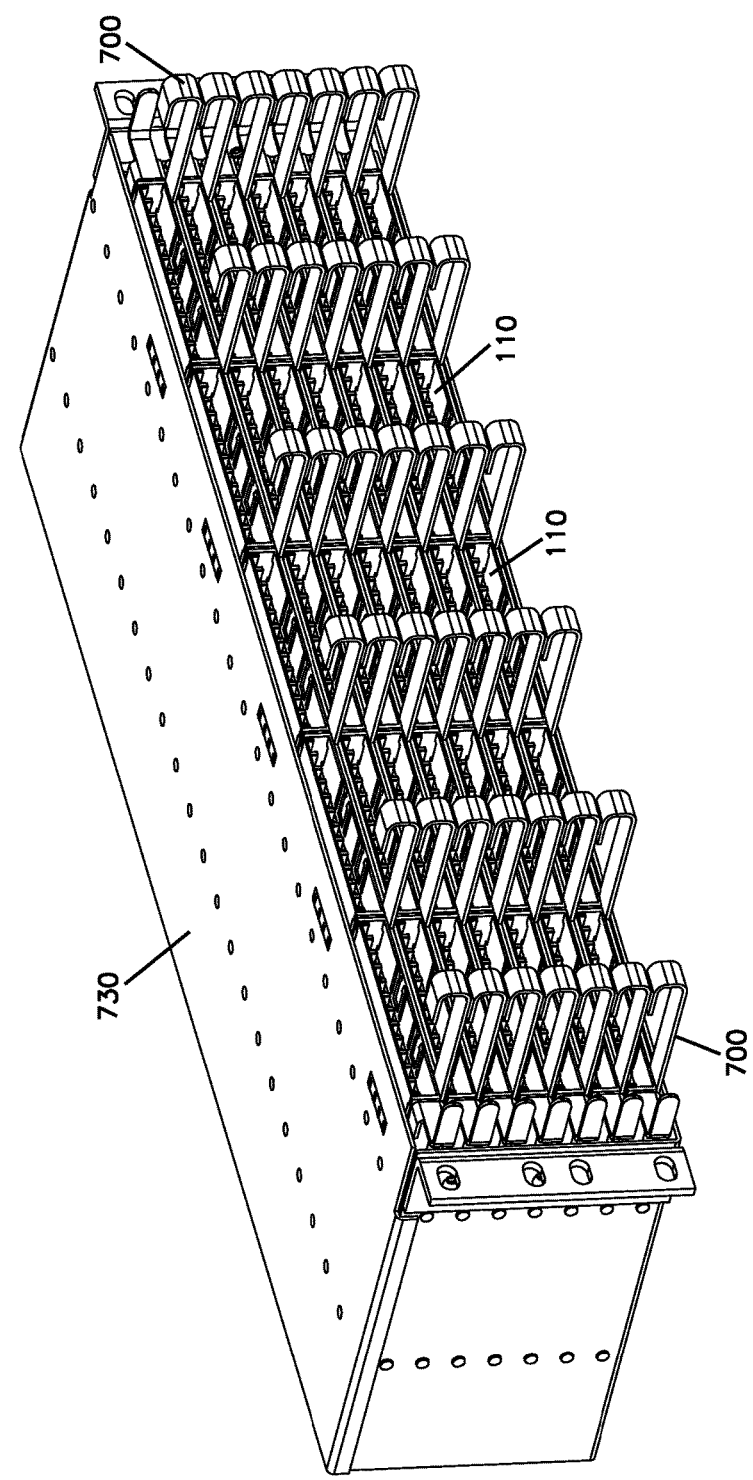

Referring now to FIGS. 34-36, cassettes 110 are shown mounted to a horizontal tray 700 which is slideably received in a chassis 730.

Figure 37:
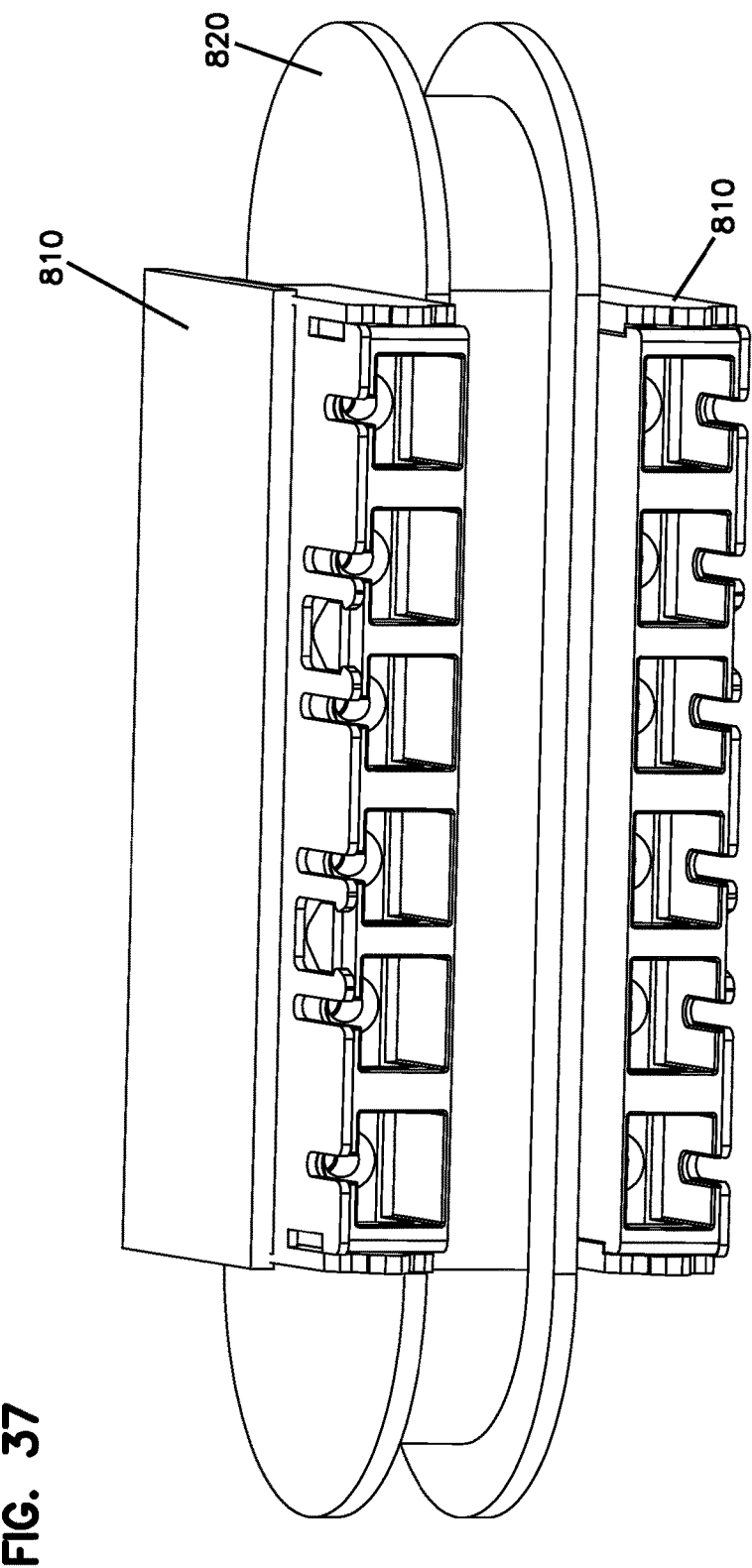
FIG. 37 shows two cassettes mounted to a spool for storage of one or more input cables.

FIG. 37 shows two cassettes 810 mounted on opposite sides of a spool 820 for storage of the input cable. Together the cassettes 810 and spool 820 form a self contained termination and slack storage unit that can be mounted to a rack, frame, cabinet, drawer, fiber trough, or other device.

In one embodiment, cassette 10 generally has a length of 3 to 4 inches (parallel to the longitudinal direction 62), a width of 2 to 3 inches (front to back), and a height of approximately ½ inch. More preferably, the length is 3 to 3½ inches, the width is 2 to 2½ inches, and the height is ½ inch. The height can vary as needed, such as to accommodate multiple rows of adapters. With such a construction, it is preferred that the cable enter at the rear of the housing with a strain relief boot and crimp parallel to the front, and that the internal cables include managed slack such as with curved internal surfaces in order to avoid going below the minimum bend radius.

Figure 38:
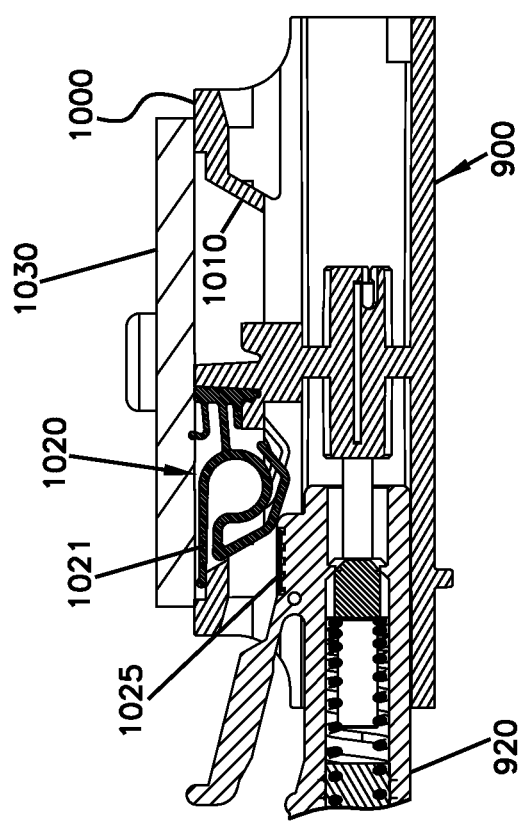
FIG. 38 shows in cross-section an example adapter holding a media reading interface.

In accordance with some aspects, certain types of adapters 900 may be configured to collect physical layer information from one or more fiber optic connectors 920 received thereat. For example, as shown in FIG. 38, certain types of adapters 900 may include a body 1000 configured to hold one or more media reading interfaces 1020 that are configured to engage memory contacts on the fiber optic connectors 920. One or more media reading interfaces 1020 may be positioned in the adapter body 1000. In certain implementations, the adapter body 1000 defines slots 1010 extending between an exterior of the adapter body 1000 and an internal passage in which the ferrules of the connectors 920 are received.

Certain types of media reading interfaces 1020 include one or more contact members 1021 that are positioned in the slots 1010. As shown in FIG. 38, a portion of each contact member 1021 extends into a respective one of the passages to engage memory contacts on a fiber optic connector 920. Another portion of each contact member 1021 also extends out of the slot 1010 to contact a circuit board 1030. Portions of the cassette may define conductive paths that are configured to connect the media reading interfaces 1020 of the adapter 900 with a master circuit board. The master circuit board may include or connect (e.g., over a network) to a processing unit that is configured to manage physical layer information obtained by the media reading interfaces. See also cassette 410 of FIGS. 20-27.

Example adapters having media reading interfaces and example fiber optic connectors having suitable memory storage and memory contacts are shown in U.S. application Ser. No. 13/025,841, filed Feb. 11, 2011, titled "Managed Fiber Connectivity Systems," the disclosure of which is hereby incorporated herein by reference.

In addition to the various uses and applications of the described cassettes, the cassettes can be used to terminate the fibers of a multi-fiber FOT cable, such as a 144 fiber cable, to make installation of the terminated cables easier and faster. Also, the cassette can be associated with a cable spool such as disclosed in US2011/0222829 or US2011/0044599, the disclosure of which is hereby incorporated herein by reference.

One advantage of the disclosed cassettes is that handling in the field of individual connectors is eliminated or MPO connectors and fanouts with upjackets are eliminated.

The invention claimed is:
1. A fiber optic cassette comprising:
a body defining a front and an opposite rear and an enclosed interior;
a cable entry location defined in the body for a cable to enter the interior of the cassette,
wherein a cable that enters at the cable entry location is attached to the cassette body, and fibers are extended into the cassette body and form terminations at first connectors that are non-traditional connectors, wherein each of the first connectors are formed of only a ferrule terminating a fiber and a ferrule hub mounted to the ferrule;
wherein the first connectors are connected to a rear side of adapters located at the front of the cassette, wherein the rear side of each adapter defines a structure for receiving the ferrule and the ferrule hub of one of the first connectors;
wherein a front side of the adapters define termination locations for cables to be connected to the fibers connected at the rear of the adapters, wherein the termination locations are configured to receive second connectors having a different format than the first non-traditional connectors connected to the rear side of the adapters, wherein each second connector is a traditional connector including one of an SC or an LC connector; and
wherein the cable includes a jacket, a strength member, and fibers, wherein the strength member is crimped to a crimp tube and is mounted to the cassette body, allowing the fibers to extend past the crimp tube into the interior of the cassette body, and wherein a strain relief boot is provided at the cable entry location.

2. The cassette of claim 1, wherein the cable entry location is located at the rear of the cassette body opposite to the front.

3. The cassette of claim 1, wherein the cassette body defines a top surface and a bottom surface which define major sides of the cassette body and extend between the front and the rear, wherein the adapters along the front are arranged linearly and extend in a longitudinal direction parallel to the major surfaces defined by the top and the bottom of the cassette body.

4. The cassette of claim 3, wherein the cable at the cable entry location extends parallel to the longitudinal direction before entry into the cassette body.

5. The cassette of claim 1, further comprising cable radius limiters which provide cable management of the fibers extending from the cable entry location to the first connectors at the rear side of the adapters.

6. The cassette of claim 1, wherein the adapters are in the form of an adapter block with a plurality of adapters and include a front end, a rear end, and internal structures which allow mating with fiber optic connectors at the front end.

7. The cassette of claim 6, wherein each of the plurality of adapters are configured to receive SC format fiber optic connectors at the front end.

8. The cassette of claim 6, wherein each of the plurality of adapters are configured to receive LC format fiber optic connectors at the front end.

9. The cassette of claim 6, wherein the adapter block is removable from a remainder of the cassette.

10. The cassette of claim 1, wherein the structure defined at the rear side of each adapter includes a rear clip which retains a split sleeve and the hub and the ferrule of a first connector which terminates an interior fiber.

11. The cassette of claim 1, wherein the cassette can be utilized in a chassis which includes a stationary mount relative to the chassis, or the cassette can be movably mounted, in a variety of sliding movements to allow access to a selected cassette, thereby improving access to a selected front second connector attached to the cassette.

12. A fiber optic cassette comprising:
a body defining a front and an opposite rear and an enclosed interior, the body further defining a top surface and a bottom surface which define major sides of the cassette body and extend between the front and the rear;
a cable entry location defined in the body for a cable to enter the interior of the cassette,
wherein a cable that enters at the cable entry location is coupled to the cassette body and fibers are extended into the cassette body and form terminations at first connectors;
wherein the first connectors are connected to a rear side of adapters of an adapter block located at the front of the cassette, each of the first connectors including a hub and ferrule and each of the adapters including a split sleeve, wherein the first connectors are non-traditional connectors formed of only the ferrule terminating a fiber and the hub mounted to the ferrule, wherein the rear side of each adapter defines a structure for receiving the ferrule and the hub of one of the first connectors;
wherein a front side of the adapters define termination locations for cables to be connected to the fibers connected at the rear side of the adapters, the termination locations configured to receive second fiber optic connectors having a different format than the first connectors, wherein each second connector is a traditional connector including one of an SC or an LC connector; and
wherein the adapters along the front of the cassette body are arranged linearly and extend in a longitudinal direction parallel to the major surfaces defined by the top and the bottom of the cassette body.

13. The cassette of claim 12, wherein each of the plurality of adapters are configured to receive LC format fiber optic connectors at the front side.

14. The cassette of claim 12, wherein each of the plurality of adapters are configured to receive SC format fiber optic connectors at the front side.

15. The cassette of claim 12, wherein the cable entry location is located at the rear of the cassette body opposite to the front.

16. The cassette of claim 12, wherein the adapter block is removable from a remainder of the cassette.

17. The cassette of claim 12, wherein the cable at the cable entry location extends parallel to the longitudinal direction before entry into the cassette body.

18. The cassette of claim 12, further comprising cable radius limiters which provide cable management of the fibers extending from the cable entry location to the first connectors at the rear side of the adapters.

19. The cassette of claim 12, wherein the cassette can be utilized in a chassis which includes a stationary mount relative to the chassis, or the cassette can be movably mounted, in a variety of sliding movements to allow access to a selected cassette, thereby improving access to a selected second fiber optic connector attached to the cassette.

* * * * *